United States Patent
Li

(10) Patent No.: US 11,258,280 B2
(45) Date of Patent: Feb. 22, 2022

(54) MOBILE TERMINAL, PERIPHERAL DEVICE, AND CHARGING METHOD THEREOF

(71) Applicant: Huawei Technologies Co., Ltd., Shenzhen (CN)

(72) Inventor: Tao Li, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 208 days.

(21) Appl. No.: 16/632,793

(22) PCT Filed: Jul. 21, 2017

(86) PCT No.: PCT/CN2017/093955
§ 371 (c)(1),
(2) Date: Jan. 21, 2020

(87) PCT Pub. No.: WO2019/014949
PCT Pub. Date: Jan. 24, 2019

(65) Prior Publication Data
US 2020/0169101 A1    May 28, 2020

(51) Int. Cl.
*H02J 7/00* (2006.01)
*H02J 7/34* (2006.01)
*H01R 13/24* (2006.01)
*H04B 1/3827* (2015.01)

(52) U.S. Cl.
CPC ........ *H02J 7/0045* (2013.01); *H01R 13/2421* (2013.01); *H02J 7/0048* (2020.01); *H02J 7/342* (2020.01); *H02J 2207/20* (2020.01); *H04B 1/3833* (2013.01)

(58) Field of Classification Search
USPC ......................... 320/106, 107, 108, 109, 110
See application file for complete search history.

(56) References Cited

U.S. PATENT DOCUMENTS

| | | |
|---|---|---|
| 2003/0011704 A1 | 1/2003 | Sawachi |
| 2006/0152484 A1 | 7/2006 | Borgward |
| 2007/0236975 A1 | 10/2007 | Lippojoki et al. |
| 2010/0109602 A1 | 5/2010 | Chang |
| 2011/0101913 A1 | 5/2011 | Matsumoto et al. |
| 2012/0266001 A1 | 10/2012 | Sha et al. |
| 2013/0016468 A1 | 1/2013 | Oh |
| 2014/0111142 A1* | 4/2014 | Lee ................. G06F 1/3206 320/107 |
| 2015/0357864 A1 | 12/2015 | Gofman |

(Continued)

FOREIGN PATENT DOCUMENTS

| | | |
|---|---|---|
| CN | 200983137 Y | 11/2007 |
| CN | 101449447 A | 6/2009 |

(Continued)

*Primary Examiner* — Brian Ngo
(74) *Attorney, Agent, or Firm* — Conley Rose, P.C.

(57) ABSTRACT

A mobile terminal, a peripheral device, and a charging method thereof that relate to the field of electronic device technologies, where the mobile terminal and the peripheral device are separately powered, and when coupled by a connector, the mobile terminal and the peripheral device charge each other. The mobile terminal includes a first switch, a second switch, a first charging port, a first charging circuit, a first connector, a first battery, and a first electronic controller.

20 Claims, 10 Drawing Sheets

(56) References Cited

U.S. PATENT DOCUMENTS

| | | | |
|---|---|---|---|
| 2018/0366967 A1* | 12/2018 | Horie | H02J 7/007192 |
| 2019/0041934 A1* | 2/2019 | Tan | G06F 1/1626 |
| 2019/0334362 A1 | 10/2019 | Sheng et al. | |
| 2020/0083721 A1 | 3/2020 | Diao et al. | |

FOREIGN PATENT DOCUMENTS

| | | | | |
|---|---|---|---|---|
| CN | 101728859 A | 6/2010 | | |
| CN | 201611466 U | 10/2010 | | |
| CN | 201699759 U | 1/2011 | | |
| CN | 102055039 A | 5/2011 | | |
| CN | 102299540 A | 12/2011 | | |
| CN | 102880298 A | 1/2013 | | |
| CN | 103135724 A | 6/2013 | | |
| CN | 103248103 A * | 8/2013 | | H02J 50/20 |
| CN | 203870561 U | 10/2014 | | |
| CN | 105576753 A | 5/2016 | | |
| CN | 205355831 U | 6/2016 | | |
| CN | 106385067 A | 2/2017 | | |
| CN | 106602663 A | 4/2017 | | |
| EP | 2717420 A1 | 4/2014 | | |
| EP | 3121926 A1 | 1/2017 | | |
| FR | 2882882 A1 * | 9/2006 | | H04M 1/05 |
| JP | H11283677 A | 10/1999 | | |
| JP | 2000357031 A | 12/2000 | | |
| JP | 2007183836 A | 7/2007 | | |
| JP | 2007527045 A | 9/2007 | | |
| JP | 4013003 B2 | 11/2007 | | |
| JP | 2015202012 A | 11/2015 | | |
| JP | 2017041983 A * | 2/2017 | | |
| JP | 2017520225 A | 7/2017 | | |
| KR | 20110016209 A * | 2/2011 | | |
| KR | 20160104113 A * | 9/2016 | | |
| WO | WO-2014000680 A1 * | 1/2014 | | H02J 7/342 |
| WO | 2016209497 A1 | 12/2016 | | |

\* cited by examiner

MOBILE TERMINAL, PERIPHERAL DEVICE, AND CHARGING METHOD THEREOF

CROSS-REFERENCE TO RELATED APPLICATIONS

This application is a U.S. National Stage of International Patent Application No. PCT/CN2017/093955 filed on Jul. 21, 2017, which is hereby incorporated by reference in its entirety.

TECHNICAL FIELD

This application relates to the field of electronic device technologies, and in particular, to a mobile terminal, a peripheral device, and a charging method thereof.

BACKGROUND

Currently, a tablet computer supplies power to a system by using a built-in lithium-ion battery. Because tablet computers on the market tend to be lighter and thinner, a battery capacity of a tablet computer is generally limited (to approximately 4000-6000 mAh) due to space limitation. In addition, a large screen size and high power consumption further limit a battery life to an average of 4-6 hours. When going out, a user usually has to take a mobile power pack, but this still cannot effectively extend a battery life. However, when an alternating current power supply is connected by using a power adapter, portability is greatly compromised. In a light-loaded office scenario, for example, when a user of a tablet computer uses office (office) software, a built-in virtual keyboard of the tablet computer occupies screen display space. If an external keyboard is used for character input and other operations, the tablet computer can be more favorable to the user for work. Such a 2-in-1 PC has a relatively good development prospect. However, in the prior art, the 2-in-1 PC still needs to be improved in terms of a battery life.

SUMMARY

Embodiments of this application disclose a mobile terminal, a peripheral device, and a charging method thereof. The mobile terminal and the peripheral device may be separately powered, and when connected by using a connector, the mobile terminal and the peripheral device may charge each other, thereby extending a battery life when the mobile terminal is used with the peripheral device.

To achieve the foregoing objective, the following technical solutions are used in the embodiments of this application:

According to a first aspect, an electronic device, a mobile terminal is provided. The mobile terminal includes a first switch, a second switch, a first charging port, a first charging circuit, a first connector, a first battery, and a first electronic controller. A first terminal of the first switch is connected to the first charging port, and a second terminal of the first switch is connected to a first end of the first charging circuit. A first terminal of the second switch is connected to the first end of the first charging circuit, and a second terminal of the second switch is connected to the first connector. A second end of the first charging circuit is connected to the first battery, and is configured to control a charging process of the first battery. The first connector is configured to connect to a peripheral device. The first electronic controller is connected to a control terminal of the first switch and a control terminal of the second switch, and communicates with the peripheral device. The first electronic controller is configured to: determine a charging mode based on a battery level of the first battery and a battery level of a second battery of the peripheral device, control states of the first switch and the second switch based on the charging mode, and send control information to the peripheral device to notify the peripheral device of the charging mode. The charging mode includes that the first battery charges the second battery, or that the second battery charges the first battery. In this solution, the mobile terminal and the peripheral device may be separately powered, and when connected by using a connector, the mobile terminal and the peripheral device may charge each other, thereby extending a battery life when the mobile terminal is used with the peripheral device. This enriches product functions and improves product competitiveness.

In an example implementation, the mobile terminal further includes a first dead zone control circuit and a first low dropout linear voltage regulator. A first input end of the first dead zone control circuit is connected to the first charging port, and an output end of the first dead zone control circuit is connected to the first electronic controller. An input end of the first low dropout linear voltage regulator is connected to a third end of the first charging circuit, and an output end of the first low dropout linear voltage regulator is connected to a second input end of the first dead zone control circuit. When the battery level of the first battery is less than or equal to a first threshold, and the first charging port is connected to a charger, the charger connected to the first charging port supplies power to the first electronic controller by using the first dead zone control circuit. When the battery level of the first battery is greater than the first threshold, the first battery supplies power to the first low dropout linear voltage regulator by using the first charging circuit, and the first low dropout linear voltage regulator supplies power to the first electronic controller by using the first dead zone control circuit. In this way, a default state of the first switch is an off state, so that when no charger is plugged in the first charging port of the mobile terminal, the first charging port of the mobile terminal is isolated from an internal circuit, and when the mobile terminal is in a normal working state, the exposed first charging port is uncharged. To control the first switch and the second switch, the first electronic controller needs normal power supply. When the battery level of the first battery is low, the first battery cannot normally supply power to the first electronic controller. Therefore, in this case, if the first switch is in the off state, even if the first charging port is connected to the charger, the first battery cannot be charged, by using the first switch, to normally supply power to the first electronic controller. Herein, the first dead zone control circuit provides a path for normal power supply to the first electronic controller, so that when the battery level of the first battery is low, if the first charging port is connected to the charger, the first electronic controller can be normally powered, and further control the first switch to be on to charge the first battery.

In an example implementation, the first dead zone control circuit includes a buck converter BUCK circuit, a first resistor, a second resistor, a third resistor, a fourth resistor, a fifth resistor, a sixth resistor, a seventh resistor, a first transistor, a second transistor, a first MOS (Metal-Oxide-Semiconductor, metal-oxide semiconductor) transistor, and a second MOS transistor. An input end of the BUCK circuit is connected to the first input end of the first dead zone control circuit. A first terminal of the first resistor is connected to the first input end of the first dead zone control circuit. A second terminal of the first resistor is connected to an enable EN (Enable) end of the BUCK circuit. The second terminal of the first resistor is further connected to a ground terminal by using the second resistor. The EN end of the BUCK circuit is further connected to a collector of the first transistor. An emitter of the first transistor is connected to the ground terminal. A base of the first transistor is connected to a first terminal of the third resistor. A second terminal of the third resistor is connected to the second input end of the first dead zone control circuit. The second terminal of the third resistor is further connected to a first terminal of the fourth resistor. An output end of the BUCK circuit is connected to a drain of the first MOS transistor. A source of the first MOS transistor is connected to a source of the second MOS transistor A gate of the first MOS transistor is connected to the ground terminal by using the fifth resistor. A second terminal of the fourth resistor is further connected to the gate of the first MOS transistor. The source of the second MOS transistor is connected to a gate of the second MOS transistor by using the sixth resistor. The source of the second MOS transistor is connected to the output end of the first dead zone control circuit. The gate of the second MOS transistor is further connected to a collector of the second transistor. A drain of the second MOS transistor is connected to the second input end of the first dead zone control circuit. A base of the second transistor is connected to the second input end of the first dead zone control circuit by using the seventh resistor.

In an example implementation, a first Schottky diode and a second Schottky diode are further included. An anode of the first Schottky diode is connected to the first charging port. A cathode of the first Schottky diode is connected to a cathode of the second Schottky diode. An anode of the second Schottky diode is connected to the second terminal of the second switch. The cathode of the first Schottky diode is further connected to the first input end of the first dead zone control circuit.

In an example implementation, the mobile terminal further includes a charger in-position detection circuit, and the charger in-position detection circuit is connected to the first charging port and the first electronic controller. The charger in-position detection circuit is configured to obtain a sampling voltage of the first charging port, and the first electronic controller is configured to determine, based on the sampling voltage, whether the first charging port is connected to a charger. When the first electronic controller determines that the first charging port is connected to a charger and/or that a second charging port of the peripheral device is connected to a charger, the first electronic controller is further configured to re-determine the charging mode. The charging mode further includes that the charger connected to the first charging port charges the first battery and the second battery, that the charger connected to the second charging port charges the first battery and the second battery, or that the charger connected to the first charging port charges the first battery and the charger connected to the second charging port charges the second battery. The charger in-position detection circuit includes an eighth resistor and a ninth resistor. A first terminal of the eighth resistor is connected to the first charging port, and a second terminal of the eighth resistor is connected to a first terminal of the ninth resistor. A second terminal of the ninth resistor is connected to a ground terminal, and the first terminal of the ninth resistor is connected to the first electronic controller. The first electronic controller is configured to: obtain a sampling voltage of the first terminal of the ninth resistor, and determine, based on the sampling voltage, whether the charging port is connected to a charger.

In an example implementation, the mobile terminal further includes a peer-device in-position detection circuit. The peer-device in-position detection circuit is connected to the first electronic controller and a second connector. The second connector is configured to connect to a ground terminal of the peer device. When the second connector is connected to the ground terminal of the peer device, the first electronic controller determines, based on a voltage level of the second connector, that the peer device is in position. The peer-device in-position detection circuit includes a tenth resistor and an eleventh resistor. A first terminal of the tenth resistor is connected to a power supply that has a predetermined voltage value, and a second terminal of the tenth resistor is connected to a first terminal of the eleventh resistor. A second terminal of the eleventh resistor is connected to a ground terminal. The second terminal of the tenth resistor is further connected to the first electronic controller and the second connector.

In an example implementation, the first charging port is a USB (Universal Serial Bus, universal serial bus) port. The first charging port includes an identification ID (identification) pin. The ID pin is connected to the first electronic controller. When an OTG (On-The-Go) transmission connector is plugged in the charging port, the first electronic controller is configured to determine, based on a voltage level of the ID pin, whether the OTG transmission connector is plugged in the first charging port.

In an example implementation, the first switch and/or the second switch includes a third MOS transistor, a fourth MOS transistor, a twelfth resistor, a thirteenth resistor, and a third transistor. A source of the third MOS transistor is connected to a source of the fourth MOS transistor. The source of the third MOS transistor is further connected to a first terminal of the twelfth resistor. A second terminal of the twelfth resistor is connected to a gate of the third MOS transistor, a gate of the fourth MOS transistor, and a first terminal of the thirteenth resistor. A second terminal of the thirteenth resistor is connected to a collector of the third transistor. An emitter of the third transistor is connected to a ground terminal. When the third MOS transistor, the fourth MOS transistor, the twelfth resistor, the thirteenth resistor, and the third transistor constitute the first switch, a drain of the third MOS transistor is connected to the first terminal of the first switch. A drain of the fourth MOS transistor is connected to the second terminal of the first switch. A base of the third transistor is connected to the control terminal of the first switch. When the third MOS transistor, the fourth MOS transistor, the twelfth resistor, the thirteenth resistor, and the third transistor constitute the second switch, a drain of the third MOS transistor is connected to the first terminal of the second switch, a drain of the fourth MOS transistor is connected to the second terminal of the second switch, and a base of the third transistor is connected to the control terminal of the second switch.

In an example implementation, a current-limited circuit is further included. A current-limited pin of the first charging circuit is connected to an input end of the current-limited circuit. A control end of the current-limited circuit is connected to the first electronic controller. The first electronic controller determines a charging power of the first battery and a charging power of the second battery based on the battery level of the first battery and the battery level of the second battery. The first electronic controller controls, based on the charging power of the first battery, a current of the current-limited pin of the first charging circuit by using the current-limited circuit, and sends the charging power of the second battery to the peripheral device. The charging power used by the first charging circuit to charge the first battery corresponds to the current of the current-limited pin. The current-limited circuit includes a fourteenth resistor, a fifteenth resistor, a sixteenth resistor, and a fourth transistor. A first terminal of the fourteenth resistor is connected to the current-limited pin of the first charging circuit, and a second terminal of the fourteenth resistor is connected to a collector of the fourth transistor. A first terminal of the fifteenth resistor is connected to the current-limited pin of the first charging circuit, and a second terminal of the fifteenth resistor is connected to a ground terminal. A gate of the fourth transistor is connected to the control end of the current-limited circuit by using the sixteenth resistor, and an emitter of the fourth transistor is connected to the ground terminal.

In an example implementation, a first display module is further included. When determining that the first battery is in a charging state, the first electronic controller controls the first display module to display an icon indicating that the mobile terminal is in a charging state. When determining that the first battery is in a power supply state, the first electronic controller controls the first display module to display an icon indicating that the mobile terminal is in a power supply state. When determining that the second battery is in a charging state, the first electronic controller controls the first display module to display an icon indicating that the peripheral device is in a charging state. When determining that the second battery is in a power supply state, the first electronic controller controls the first display module to display an icon indicating that the peripheral device is in a power supply state.

In an example implementation, the first electronic controller is specifically configured to: when determining that the battery level of the first battery of the mobile terminal is relatively low and is less than a third threshold, determine that the charging mode is that the second battery charges the first battery. The first electronic controller is specifically configured to: when determining that the battery level of the second battery of the peripheral device is relatively low and is less than a fourth threshold, determine that the charging mode is that the first battery charges the second battery.

In an example implementation, when the first battery charges the second battery, if the first electronic controller determines that the battery level of the first battery is less than a fifth threshold, the first electronic controller is configured to control the second switch to be off, and send a charging termination control instruction to the peripheral device.

In an example implementation, when the second battery charges the first battery, if the first electronic controller determines that the battery level of the second battery is less than a sixth threshold, the first electronic controller is configured to control the second switch to be off, and send a power supply termination control instruction to the peripheral device.

In an example implementation, the first connector is a pogo pin spring thimble connector.

According to a second aspect, a peripheral device is provided. The peripheral device includes a third switch, a fourth switch, a second charging port, a second charging circuit, a third connector, a second battery, and a second electronic controller. A first terminal of the third switch is connected to the second charging port, and a second terminal of the third switch is connected to a first end of the second charging circuit. A first terminal of the fourth switch is connected to the first end of the second charging circuit, and a second terminal of the fourth switch is connected to the third connector. A second end of the second charging circuit is connected to the second battery, and is configured to control a charging process of the second battery. The third connector is configured to connect to a mobile terminal. The second electronic controller is connected to a control terminal of the third switch and a control terminal of the fourth switch, and communicates with the mobile terminal. The second electronic controller is configured to: determine a charging mode based on control information sent by the mobile terminal, and control states of the third switch and the fourth switch based on the charging mode. The charging mode includes that the second battery charges a first battery, or that the first battery charges the second battery. In this solution, the mobile terminal and the peripheral device may be separately powered, and when connected by using a connector, the mobile terminal and the peripheral device may charge each other, thereby extending a battery life when the mobile terminal is used with the peripheral device. This enriches product functions and improves product competitiveness.

In an example implementation, the peripheral device further includes a second dead zone control circuit and a second low dropout linear voltage regulator. A first input end of the second dead zone control circuit is connected to the second charging port, and an output end of the second dead zone control circuit is connected to the second electronic controller. An input end of the second low dropout linear voltage regulator is connected to a third end of the second charging circuit, and an output end of the second low dropout linear voltage regulator is connected to a second input end of the second dead zone control circuit. When a battery level of the second battery is less than or equal to a second threshold, and the second charging port is connected to a charger, the charger connected to the second charging port supplies power to the second electronic controller by using the second dead zone control circuit. When the battery level of the second battery is greater than the second threshold, the second battery supplies power to the second low dropout linear voltage regulator by using the second charging circuit, and the second low dropout linear voltage regulator supplies power to the second electronic controller by using the second dead zone control circuit. In this way, a default state of the third switch is an off state, so that when no charger is plugged in the second charging port of the mobile terminal, the second charging port of the mobile terminal is isolated from an internal circuit, and when the mobile terminal is in a normal working state, the exposed second charging port is uncharged. To control the third switch and the fourth switch, the second electronic controller needs normal power supply. When the battery level of the second battery is low, the second battery cannot normally supply power to the second electronic controller. Therefore, in this case, if the third switch is in the off state, even if the second charging port is connected to the charger, the second battery cannot be charged, by using the third switch, to normally supply power to the second electronic controller. Herein, the second dead zone control circuit provides a path for normal power supply to the second electronic controller, so that when the battery level of the second battery is low, if the second charging port is connected to the charger, the second electronic controller can be normally powered, and further control the third switch to be on to charge the second battery.

In an example implementation, a second display module is further included. When determining that the first battery is in a charging state, the second electronic controller controls the second display module to display an icon indicating that the mobile terminal is in a charging state. When determining that the first battery is in a power supply state, the second electronic controller controls the second display module to display an icon indicating that the mobile terminal is in a power supply state. When determining that the second battery is in a charging state, the second electronic controller controls the second display module to display an icon indicating that the peripheral device is in a charging state. When determining that the second battery is in a power supply state, the second electronic controller controls the second display module to display an icon indicating that the peripheral device is in a power supply state.

In an example implementation, the second electronic controller is further configured to: receive a charging termination control instruction sent by the mobile terminal, and control, according to the charging termination control instruction, the fourth switch to be off.

In an example implementation, the second electronic controller is further configured to: receive a power supply termination control instruction sent by the mobile terminal, and control, according to the power supply termination control instruction, the fourth switch to be off.

According to a third aspect, a charging method of a mobile terminal is provided. The charging method includes: determining, by the mobile terminal, a charging mode based on a battery level of a first battery of the mobile terminal and a battery level of a second battery of a peripheral device; and controlling, by the mobile terminal, states of a first switch and a second switch based on the charging mode, and sending control information to the peripheral device to notify the peripheral device of the charging mode, where the charging mode includes that the first battery charges the second battery of the peripheral device, or that the second battery charges the first battery. In this solution, the mobile terminal and the peripheral device may be separately powered, and when connected by using a connector, the mobile terminal and the peripheral device may charge each other, thereby extending a battery life when the mobile terminal is used with the peripheral device. This enriches product functions and improves product competitiveness.

In an example implementation, the method further includes: determining, by the mobile terminal based on a sampling voltage of a first charging port of the mobile terminal, whether the first charging port is connected to a charger; and when determining that the first charging port of the mobile terminal is connected to a charger and/or that a second charging port of the peripheral device is connected to a charger, re-determining, by the mobile terminal, the charging mode, where the charging mode further includes that the charger connected to the first charging port charges the first battery and the second battery, that the charger connected to the second charging port of the peripheral device charges the first battery and the second battery, or that the charger connected to the first charging port charges the first battery and the charger connected to the second charging port charges the second battery.

In an example implementation, the method further includes: determining, by the mobile terminal, a charging power of the first battery and a charging power of the second battery based on the battery level of the first battery of the mobile terminal and the battery level of the second battery of the peripheral device, and sending the charging power of the second battery to the peripheral device.

In an example implementation, the method further includes: when determining that the first battery is in a charging state, displaying, by the mobile terminal, an icon indicating that the mobile terminal is in a charging state; when determining that the first battery is in a power supply state, displaying, by the mobile terminal, an icon indicating that the mobile terminal is in a power supply state; when determining that the second battery is in a charging state, displaying, by the mobile terminal, an icon indicating that the peripheral device is in a charging state; and when determining that the second battery is in a power supply state, displaying, by the mobile terminal, an icon indicating that the peripheral device is in a power supply state.

In an example implementation, the determining, by the mobile terminal, a charging mode based on a battery level of a first battery of the mobile terminal and a battery level of a second battery of a peripheral device includes: when determining that the battery level of the first battery of the mobile terminal is relatively low and is less than a third threshold, determining, by the mobile terminal, that the charging mode is that the second battery charges the first battery; or when determining that the battery level of the second battery of the peripheral device is relatively low and is less than a fourth threshold, determining, by the mobile terminal, that the charging mode is that the first battery charges the second battery.

In an example implementation, when the first battery charges the second battery, if the mobile terminal determines that the battery level of the first battery is less than a fifth threshold, the mobile terminal controls the second switch to be off, and sends a charging termination control instruction to the peripheral device.

In an example implementation, when the second battery charges the first battery, if the mobile terminal determines that the battery level of the second battery is less than a sixth threshold, the mobile terminal controls the second switch to be off, and sends a power supply termination control instruction to the peripheral device.

According to a fourth aspect, a charging method of a peripheral device is provided. The charging method includes: determining, by the peripheral device, a charging mode based on control information sent by a mobile terminal; and controlling, by the peripheral device, states of a third switch and a fourth switch based on the charging mode, where the charging mode includes that a second battery charges a first battery, or that the first battery charges the second battery. In this solution, the mobile terminal and the peripheral device may be separately powered, and when connected by using a connector, the mobile terminal and the peripheral device may charge each other, thereby extending a battery life when the mobile terminal is used with the peripheral device. This enriches product functions and improves product competitiveness.

In an example implementation, the method further includes: when determining that the first battery is in a charging state, displaying, by the peripheral device, an icon indicating that the mobile terminal is in a charging state; when determining that the first battery is in a power supply state, displaying, by the peripheral device, an icon indicating that the mobile terminal is in a power supply state; when determining that the second battery is in a charging state, displaying, by the peripheral device, an icon indicating that the peripheral device is in a charging state; and when determining that the second battery is in a power supply state, displaying, by the peripheral device, an icon indicating that the peripheral device is in a power supply state.

In an example implementation, the method further includes: receiving, by the peripheral device, a charging termination control instruction sent by the mobile terminal, and controlling, according to the charging termination control instruction, the fourth switch to be off.

In an example implementation, the method further includes: receiving, the peripheral device, a power supply termination control instruction sent by the mobile terminal, and controlling, according to the power supply termination control instruction, the fourth switch to be off.

BRIEF DESCRIPTION OF DRAWINGS

To describe the technical solutions in the embodiments of this application or in the prior art more clearly, the following briefly describes the accompanying drawings required for describing the embodiments or the prior art.

DESCRIPTION OF EMBODIMENTS

Figure 1:
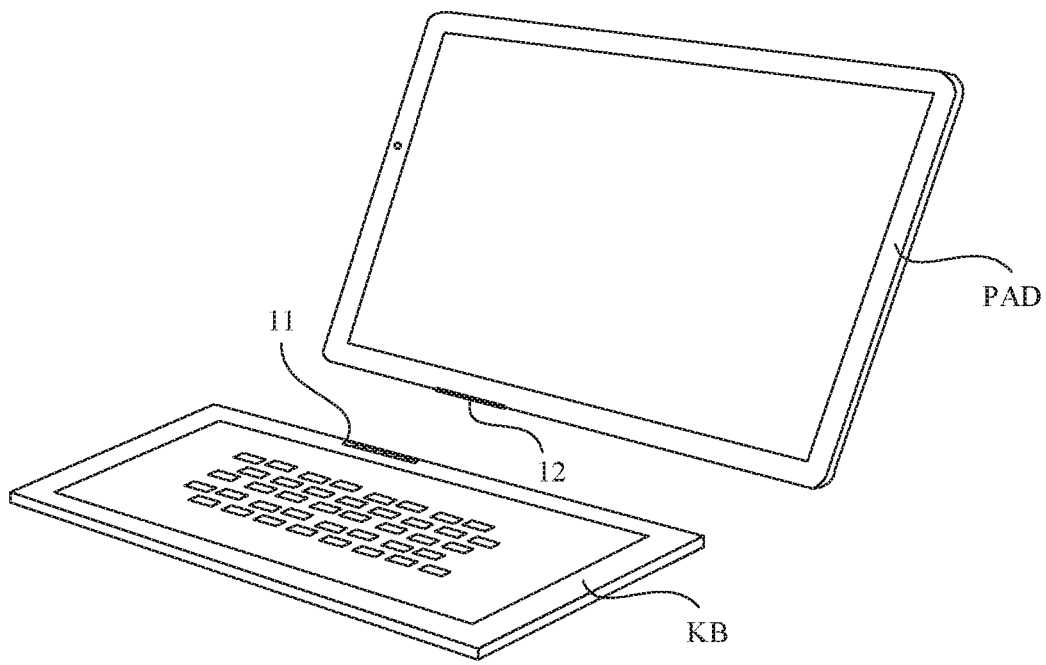
FIG. 1 is a schematic diagram of an application scenario according to an embodiment of this application.

The following describes the embodiments of this application with reference to accompanying drawings.

Embodiments of this application relate to a mobile terminal and a peripheral device of the mobile terminal. The mobile terminal may be a mobile phone, a tablet computer, a PDA (Personal Digital Assistant, personal digital assistant), a POS (Point of Sales, point of sale), an in-vehicle computer, or the like. The mobile terminal may include components such as an RF (Radio Frequency, radio frequency) circuit, a memory, another input device, a display screen, a sensor, an audio circuit, an I/O subsystem, a processor, a charging management chip, and a power management chip. The mobile terminal may further include components such as a camera, a Bluetooth module, a virtual key, and a physical key, and details are not described herein. A person skilled in the art may understand that the foregoing structure of the mobile terminal does not constitute any limitation, and the mobile terminal may include more or fewer components, or combine some components, or split some components, or have different component arrangements. A person skilled in the art may understand that the display screen belongs to a user interface (UI, User Interface), and a mobile phone may include more or fewer user interfaces than those shown in a figure. In a working process of the mobile terminal, a battery in the mobile terminal may supply power to the foregoing components. The peripheral device may be a keyboard, a docking station, VR (Virtual Reality, virtual reality) glasses, or the like. The peripheral device also has a battery, and the battery in the peripheral device may supply power to the peripheral device.

In the embodiments of this application, the mobile terminal and the peripheral device of the mobile terminal both include a battery. When the mobile terminal and the peripheral device of the mobile terminal are connected, for example, a first battery of the mobile terminal may charge a second battery of the peripheral device. For another example, the second battery of the peripheral device may charge the first battery of the mobile terminal. In addition, when the mobile terminal is connected to a charger, both the first battery of the mobile terminal and the second battery of the peripheral device may be charged by using the charger connected to the mobile terminal. Certainly, when the peripheral device is connected to a charger, both the first battery of the mobile terminal and the second battery of the peripheral device may be charged by using the charger connected to the peripheral device. In addition, the mobile terminal and the peripheral device may be connected to chargers to charge their respective batteries.

In the following embodiments, an example in which a mobile terminal is a tablet computer and a peripheral device is a keyboard may be used to describe in detail how to meet an increasingly high requirement for a battery life of the tablet computer. It should be understood that a combination of another mobile terminal and another peripheral device, for example, a mobile phone and a docking station, may also be applied to an application scenario in the embodiments of this application.

In an implementation, a keyboard is a wireless keyboard, and the wireless keyboard and a tablet computer need to be separately powered by using power supplies independent of each other. When either the wireless keyboard or the tablet computer runs out of power, the one that runs out of power cannot continue to be used. In another prior-art implementation, a keyboard is powered by a tablet computer. In this implementation, the keyboard can be used only when the keyboard and the tablet computer are connected to each other, and cannot be used when the keyboard and the tablet computer are separated, greatly compromising usability. However, according to the embodiments of this application, a mobile terminal and a peripheral device may be separately powered, and the two devices (for example, a tablet computer and a keyboard) can charge each other when connected by using hardware connectors.

Figure 2:
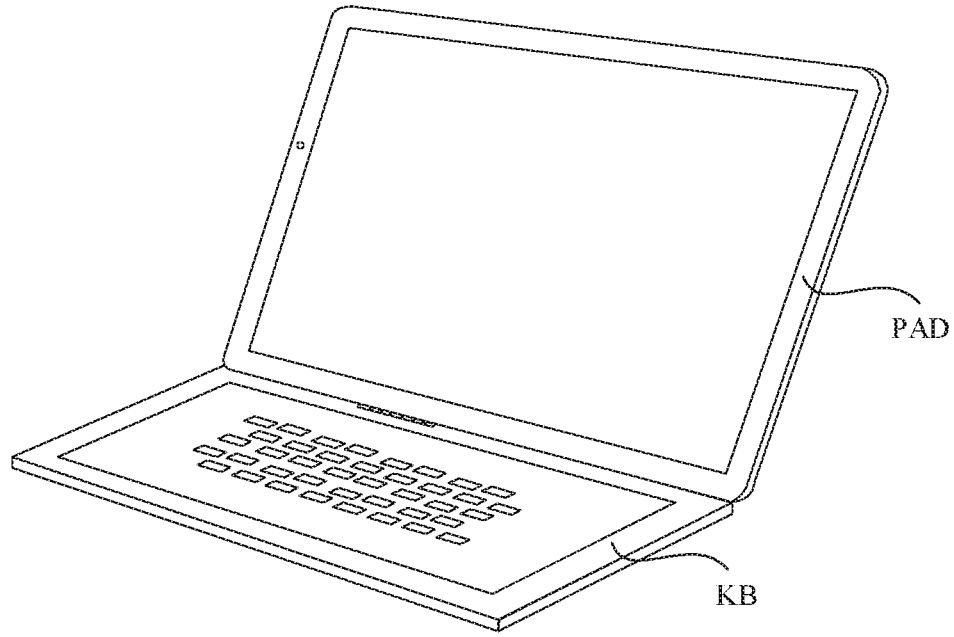
FIG. 2 is a schematic diagram of another application scenario according to an embodiment of this application.
Figure 3:
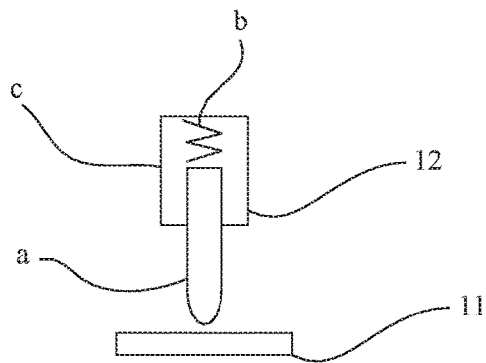
FIG. 3 is a schematic diagram of a connection manner of a connector according to an embodiment of this application.

Specifically, the embodiments of this application are described by using interaction between a tablet computer PAD and a keyboard KB. Specifically, as shown in FIG. 1, an application scenario of this application may be as follows: The tablet computer PAD and the keyboard KB may be used separately, where the tablet computer PAD and the keyboard KB both have a built-in power supply (battery); and when the tablet computer PAD and the keyboard KB are used separately, the tablet computer PAD may communicate with the keyboard KB by using a wireless signal. In addition, as shown in FIG. 2, the tablet computer PAD and the keyboard KB may alternatively be used in combination. When the tablet computer PAD and the keyboard KB are used in combination, the tablet computer PAD is electrically connected to and communicates with the keyboard KB by using hardware connectors (a pogo pin connector 11 and an electrode disk 12). In this application, the tablet computer PAD and the keyboard KB may be electrically connected by using the pogo pin connector. When a connector disposed on the tablet computer PAD is the pogo pin connector, a connector disposed on the keyboard KB is the electrode disk. Alternatively, when the connector disposed on the keyboard KB is the pogo pin connector, the connector disposed on the tablet computer PAD is the electrode disk. In the example provided in FIG. 1, the connector disposed on the keyboard KB is the pogo pin connector 11, and the connector disposed on the tablet computer PAD is the electrode disk 12. As shown in FIG. 2, when the tablet computer PAD and the keyboard KB are attached to each other in a location relationship, the pogo pin connector is electrically connected to the corresponding electrode disk, so that the tablet computer PAD is connected to the keyboard KB. As shown in FIG. 3, in this solution, the pogo pin is a spring thimble including a plunger a, a spring b, and a tube c after these three basic components are riveted and preloaded by using a precision instrument. The pogo pin has a precise spring structure inside. The pogo pin has good corrosion resistance, stability, and durability. That the pogo pin connector Co1 is electrically connected to the corresponding electrode disk Co2 means that, a head of the spring thimble is pressed against the electrode plate, so that a signal can be transmitted between the tablet computer PAD and the keyboard KB by using a connection relationship formed by the electrode disk and the pogo pin connector. Certainly, the signal is not limited to a current signal, a voltage signal, a data signal, or the like.

Figure 4:
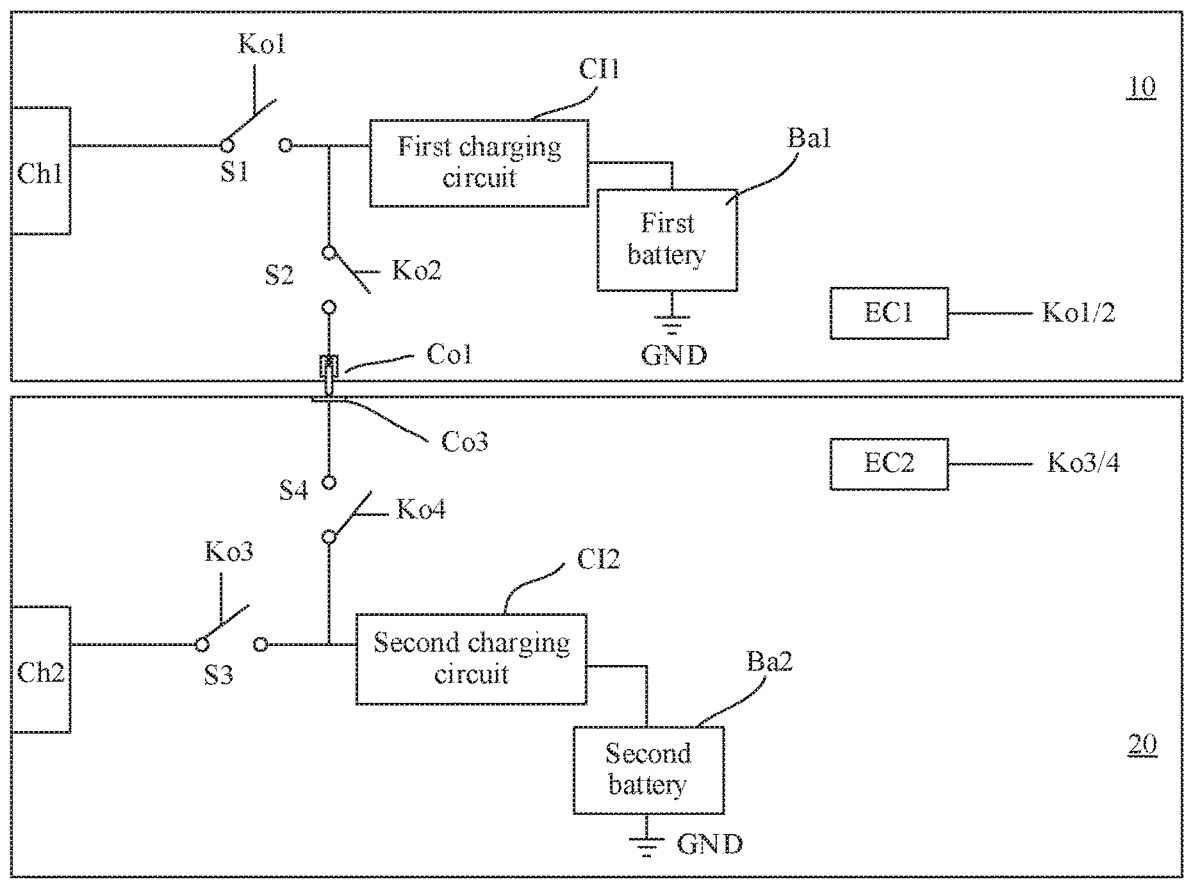
FIG. 4 is a schematic structural diagram of a mobile terminal and a peripheral device according to an embodiment of this application.

As shown in FIG. 4, a mobile terminal 10 provided in an embodiment of this application includes a first switch S1, a second switch S2, a first charging port Ch1, a first charging circuit CI1, a first connector Co1, a first battery Ba1, and a first electronic controller EC1.

Connection relationships of the foregoing structures included in the mobile terminal 10 are as follows:

A first terminal of the first switch S1 is connected to the first charging port Ch1, and a second terminal of the first switch S1 is connected to a first end of the first charging circuit CI1. A first terminal of the second switch S2 is connected to the first end of the first charging circuit CI1, and a second terminal of the second switch S2 is connected to the first connector Co1. A second end of the first charging circuit CI1 is connected to the first battery Ba1, and is configured to control a charging process of the first battery Ba1. The first connector Co1 is configured to connect to a peripheral device 20. The first electronic controller EC1 is connected to a control terminal Ko1 of the first switch S1 and a control terminal Ko2 of the second switch S2, and communicates with the peripheral device 20.

As shown in FIG. 4, the peripheral device 20 provided in this embodiment of this application includes a third switch S3, a fourth switch S4, a second charging port Ch2, a second charging circuit CI2, a third connector Co3, a second battery Ba2, and a second electronic controller EC2.

Connection relationships of the foregoing structures included in the peripheral device 20 are as follows:

A first terminal of the third switch S3 is connected to the second charging port Ch2, a second terminal of the third switch S3 is connected to a first end of the second charging circuit CI2. A first terminal of the fourth switch S4 is connected to the first end of the second charging circuit CI2, and a second terminal of the fourth switch S4 is connected to the third connector Co3. A second end of the second charging circuit CI2 is connected to the second battery Ba2, and is configured to control a charging process of the second battery Ba2. The third connector Co3 is configured to connect to the mobile terminal 10. The second electronic controller EC2 is connected to a control terminal Ko3 of the third switch S3 and a control terminal Ko4 of the fourth switch S4, and communicates with the mobile terminal 10.

Functionally, the first electronic controller EC1 is configured to: determine a charging mode based on a battery level of the first battery Ba1 and a battery level of the second battery Ba2 of the peripheral device 20, control states of the first switch S1 and the second switch S2 based on the charging mode, and send control information to the peripheral device 20 to notify the peripheral device 20 of the charging mode. The second electronic controller EC2 is configured to: determine the charging mode based on the control information sent by the mobile terminal 10, and control states of the third switch S3 and the fourth switch S4 based on the charging mode. The charging mode includes that the first battery Ba1 charges the second battery Ba2, or that the second battery Ba2 charges the first battery Ba1.

For the application scenario shown in FIG. 2, as shown in FIG. 4, the first connector Co1 of the tablet computer PAD is electrically connected to the third connector Co3 of the keyboard KB. The second terminal of the second switch S2 of the tablet computer PAD is electrically connected to the second terminal of the fourth switch S4 of the keyboard KB. When the charging mode is that the first battery Ba1 charges the second battery Ba2, the first electronic controller EC1 controls, based on the charging mode, the second switch S2 of the tablet computer PAD to be on, and the second electronic controller EC2 controls, based on the charging mode, the fourth switch S4 of the keyboard KB to be on. Similarly, when the charging mode is that the second battery Ba2 charges the first battery Ba1, the first electronic controller EC1 controls, based on the charging mode, the second switch S2 of the tablet computer PAD to be on, and the second electronic controller EC2 controls, based on the charging mode, the fourth switch S4 of the keyboard KB to be on.

When neither the tablet computer PAD nor the keyboard KB uses a charger, the first electronic controller EC1 of the tablet computer PAD controls the first switch S1 of the tablet computer PAD to be off, and the first electronic controller EC1 of the keyboard KB controls the third switch S3 of the keyboard KB to be off. In this way, the first charging port Ch1 and the second charging port Ch2 can be prevented from being charged.

A path for that the first battery Ba1 charges the second battery Ba2 is as follows: the first battery Ba1→the first charging circuit CI1→the second switch S2→the fourth switch S4→the second charging circuit CI2 the second battery Ba2. In this case, the first charging circuit CI1 of the tablet computer PAD works in a reverse boost (boost) mode, and the second charging circuit CI2 of the keyboard KB works in a BUCK (buck) mode. A path for that the second battery Ba2 charges the first battery Ba1 is as follows: the second battery Ba2→the second charging circuit CI2→the fourth switch S4→the second switch S2→the first charging circuit CI1→the first battery Ba1. In this case, the second charging circuit CI2 of the keyboard KB works in the reverse boost mode, and the first charging circuit CI1 of the tablet computer PAD works in the BUCK mode.

In addition, for implementation of control on the foregoing switches, the first electronic controller EC1 of the tablet computer PAD may detect the battery level of the first battery Ba1 by using the first charging circuit CI1, and certainly, the second electronic controller EC2 of the keyboard KB may detect the battery level of the second battery Ba2 by using the second charging circuit CI2. In addition, the first electronic controller EC1 and the second electronic controller EC2 may communicate with each other. Such communication may be wireless communication or wired communication. For example, the EC1 and the EC2 may be connected to each other by using at least one connector, or a Bluetooth, infrared, or NFC (Near Field Communication, near field communication) connection may be established between the EC1 and the EC2. The first electronic controller EC1 is used as a primary controller and may receive information reported by the second electronic controller EC2 that is used as a secondary controller, and the first electronic controller EC1 may send control information to the second electronic controller EC2. For example, when the tablet computer PAD and the keyboard KB are connected to each other, the EC1 of the tablet computer PAD and the EC2 of the keyboard KB may implement data communication by using a USB protocol. For example, two pairs of connectors are disposed between the EC1 of the tablet computer PAD and the EC2 of the keyboard KB, and are separately configured to transmit a pair of USB differential (D+ and D−) signals.

The first electronic controller EC1 is specifically configured to: when determining that the battery level of the first battery Ba1 is relatively low and is less than a third threshold, determine that the charging mode is that the second battery Ba2 charges the first battery Ba1. The first electronic controller EC1 is specifically configured to: when determining that the battery level of the second battery Ba2 is relatively low and is less than a fourth threshold, determine that the charging mode is that the first battery Ba1 charges the second battery Ba2. During charging, for example, when the first battery Ba1 charges the second battery Ba2, if the first electronic controller EC1 determines that the battery level of the first battery Ba1 is less than a fifth threshold, the first electronic controller EC1 is configured to control the second switch K2 to be off, and send a charging termination control instruction to the keyboard KB. The second electronic controller EC2 is configured to: receive the charging termination control instruction sent by the tablet computer PAD, and control, according to the charging termination control instruction, the fourth switch S4 to be off. When the second battery Ba2 charges the first battery Ba1, if the first electronic controller EC1 determines that the battery level of the second battery Ba2 is less than a sixth threshold, the first electronic controller EC1 is configured to control the second switch S2 to be off, and send a power supply termination control instruction to the keyboard KB. The second electronic controller EC2 is further configured to: receive the power supply termination control instruction sent by the tablet computer PAD, and control, according to the power supply termination control instruction, the fourth switch K4 to be off.

In this solution, the mobile terminal and the peripheral device may be separately powered, and when connected by using a connector, the mobile terminal and the peripheral device may charge each other, thereby extending a battery life when the mobile terminal is used with the peripheral device. This enriches product functions and improves product competitiveness.

Figure 5:
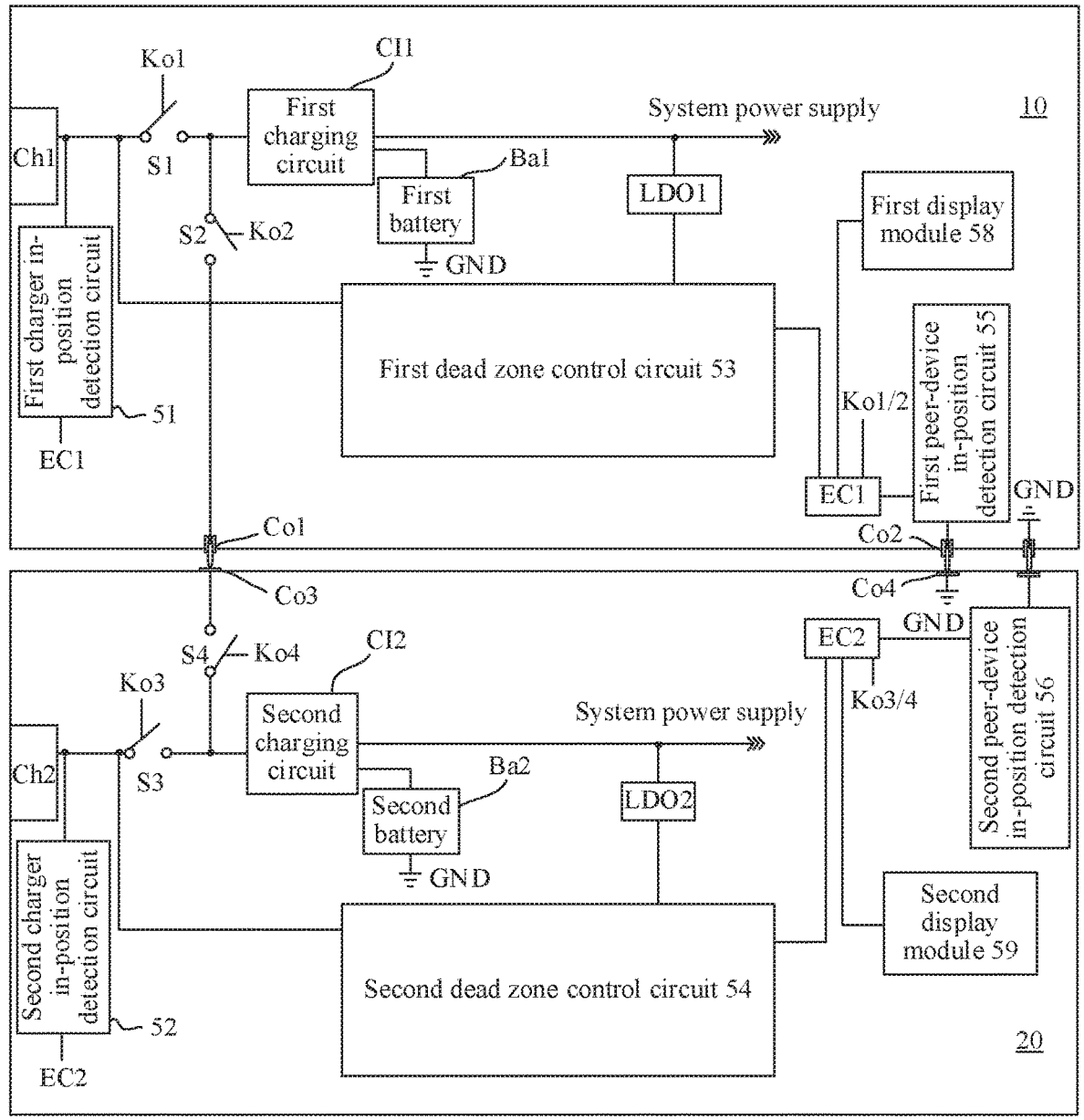
FIG. 5 is a schematic structural diagram of a mobile terminal and a peripheral device according to another embodiment of this application.

In addition, as shown in FIG. 5, when a charger is used, the tablet computer PAD further includes a first charger in-position detection circuit 51. The first charger in-position detection circuit 51 is connected to the first charging port Ch1 and the first electronic controller EC1. The first charger in-position detection circuit 51 is configured to obtain a sampling voltage of the first charging port Ch1. The first electronic controller EC1 is configured to determine, based on the sampling voltage, whether the first charging port Ch1 is connected to a charger. For example, to match the sampling voltage and a withstand voltage of the first electronic controller EC1 and prevent the first electronic controller EC1 from being damaged by an excessively high sampling voltage, a specific structure of the first charger in-position detection circuit 51 is provided.

Figure 6:
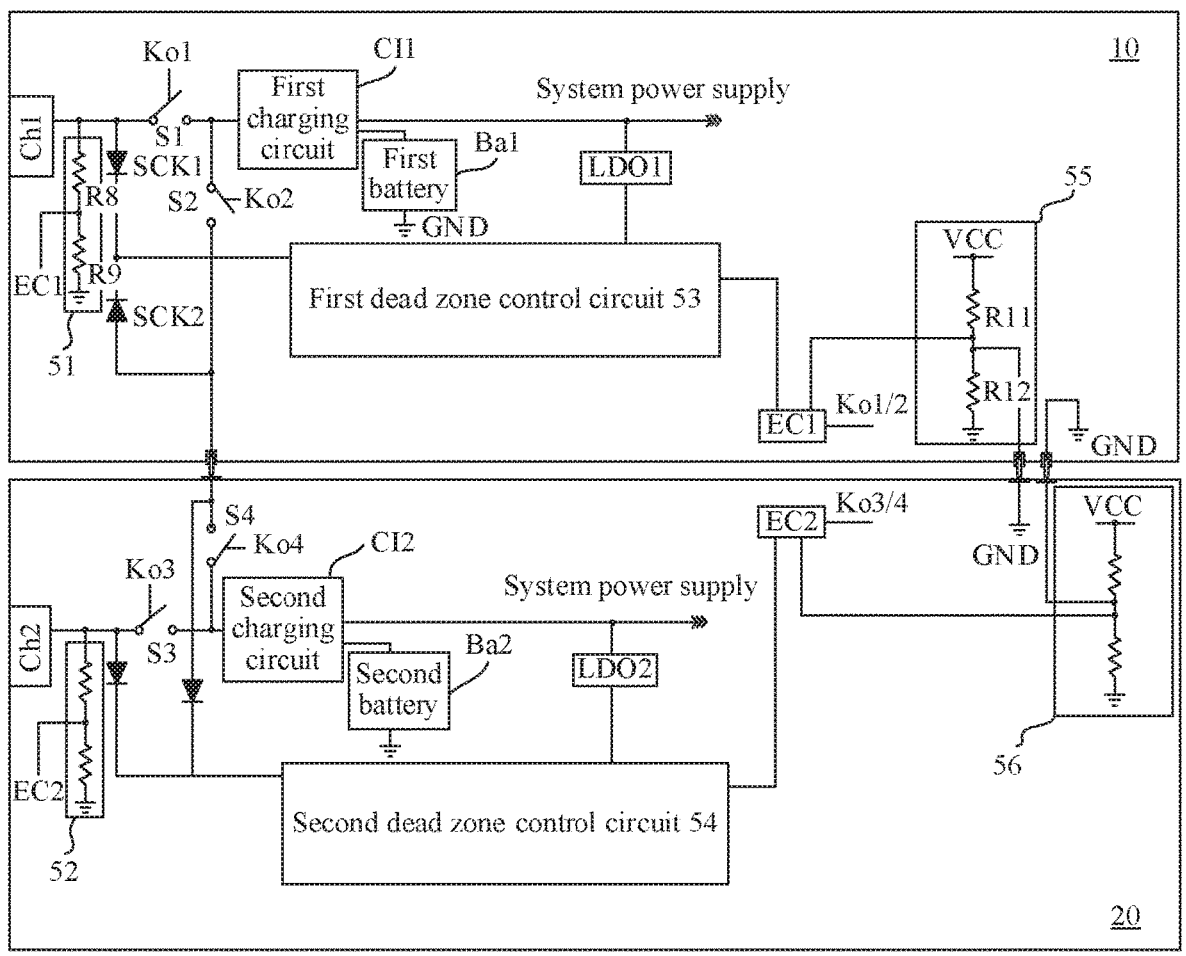
FIG. 6 is a schematic structural diagram of a mobile terminal and a peripheral device according to still another embodiment of this application.

As shown in FIG. 6, the first charger in-position detection circuit 51 includes an eighth resistor R8 and a ninth resistor R9. A first terminal of the eighth resistor R8 is connected to the first charging port Ch1, and a second terminal of the eighth resistor R8 is connected to a first terminal of the ninth resistor R8. A second terminal of the ninth resistor R9 is connected to a ground terminal GND, and the first terminal of the ninth resistor R9 is connected to the first electronic controller EC1. The first electronic controller EC1 is configured to: obtain a sampling voltage of the first terminal of the ninth resistor R9, and determine, based on the sampling voltage, whether the charging port is connected to a charger. For example, when no charger is plugged in the first charging port Ch1, the EC1 detects an equal electric potential between a voltage level of the first terminal of the R9 and that of the GND. When a charger is plugged in the first charging port Ch1, the EC1 detects that the voltage level of the first terminal of the R9 is a divided voltage obtained by the resistor R9 from a power supply provided by the charger, and based on this, the EC1 can implement charger in-position detection.

In addition, the keyboard KB also has a second charger in-position detection circuit 52. A specific structure and a connection manner of the second charger in-position detection circuit 52 are similar to those of the tablet computer PAD, and details are not described herein again. The second electronic controller EC2 may also determine, based on a sampling voltage of the second charger in-position detection circuit 52 of the keyboard KB, whether the keyboard KB is connected to a charger, and notifies the first electronic controller EC1. In this way, the first electronic controller EC1 can learn whether the tablet computer PAD and the keyboard KB each are connected to a charger.

When the first electronic controller EC1 determines that the first charging port Ch1 is connected to a charger and/or that the second charging port Ch2 of the keyboard KB is connected to a charger, the first electronic controller EC1 is further configured to re-determine the charging mode. The charging mode further includes that the charger connected to the first charging port Ch1 charges the first battery Ba1 and the second battery Ba2, that the charger connected to the second charging port Ch1 charges the first battery Ba1 and the second battery Ba2, or that the charger connected to the first charging port Ch1 charges the first battery Ba1 and the charger connected to the second charging port Ch2 charges the second battery Ba2.

When the charging mode is that the charger connected to the first charging port Ch1 charges the first battery Ba1 and the second battery Ba2, the first electronic controller EC1 controls, based on the charging mode, the first switch S1 and the second switch S2 to be on, and the second electronic controller EC2 controls, based on the charging mode, the fourth switch S4 to be on and the third switch S3 to be off. When the charging mode is that the charger connected to the second charging port Ch1 charges the first battery Ba1 and the second battery Ba2, the first electronic controller EC1 controls, based on the charging mode, the first switch S1 to be off and the second switch S2 to be on, and the second electronic controller EC2 controls, based on the charging mode, the third switch S3 and the fourth switch S4 to be on.

In addition, the first charging port Ch1 may include but is not limited to an extension port such as a USB (Universal Serial Bus, universal serial bus) port, an HDMI (High Definition Multimedia Interface, high definition multimedia interface) port, and a URAT (Universal Asynchronous Receiver/Transmitter, universal asynchronous receiver/transmitter) port. The following solutions are described by using the USB port as an example. The second charging port Ch2 may include but is not limited to an extension port such as a USB port, an HDMI port, and a URAT port. The following solutions are described by using the USB port as an example.

That a charger is used for charging may specifically include the following two solutions.

Solution 1: A charger is plugged in a USB port of the tablet computer. The EC1 of the tablet computer PAD controls the first switch S1 and the second switch S2 of the tablet computer PAD to be on, the EC2 of the keyboard KB controls the fourth switch S4 of the keyboard KB to be on, and the EC2 of the keyboard KB controls the third switch S3 of the keyboard KB to be off.

A charging path 1 is as follows: the charger→the USB port of the tablet computer PAD→the first switch S1 of the tablet computer PAD→the first charging circuit CI1 of the tablet computer PAD→the first battery Ba1 of the tablet computer PAD.

A charging path 2 is as follows: the charger→the USB port of the tablet computer PAD→the first switch S1 of the tablet computer PAD→the second switch S2 of the tablet computer PAD→the fourth switch S4 of the keyboard KB→the second charging circuit Ch2 of the keyboard KB→the second battery Ba2 of the keyboard KB.

Solution 2: A charger is plugged in a USB port of the keyboard. The EC1 of the tablet computer PAD controls the second switch S2 of the tablet computer PAD to be on, the EC1 of the tablet computer PAD controls the first switch S1 of the tablet computer PAD to be off, and the EC2 of the keyboard KB controls the third switch S3 and the fourth switch S4 of the keyboard KB to be on.

A charging path 1 is as follows: the charger→the USB port of the keyboard KB→the third switch S3 of the keyboard KB→the second charging circuit Ch2 of the keyboard KB→the second battery Ba2 of the keyboard KB.

A charging path 2 is as follows: the charger→the USB port of the keyboard KB→the third switch S3 of the keyboard KB→the fourth switch S4 of the keyboard KB→the second switch S2 of the tablet computer PAD→the first charging circuit Ch1 of the tablet computer PAD→the first battery Ba1 of the tablet computer PAD.

When the charger is plugged in the USB port of the tablet computer and the charger is plugged in the USB port of the keyboard, the EC1 of the tablet computer PAD may alternatively control the second switch S2 of the tablet computer PAD to be off and the first switch S1 to be on, and the EC2 of the keyboard KB controls the fourth switch S4 of the keyboard KB to be off and the third switch S3 to be on, so that the tablet computer PAD and the keyboard KB are separately charged. Certainly, even if the charger is plugged in the USB port of the tablet computer and the charger is plugged in the USB port of the keyboard, charging may be implemented according to the mode provided in Solution 1 or Solution 2 by using only one charger. In this way, the foregoing five charging modes can be implemented between the tablet computer PAD and the keyboard KB by using only a connection between the first connector and the third connector, thereby improving reliability of mutual charging between devices, and simplifying a connection structure between the devices.

In addition, as shown in FIG. 5, the tablet computer PAD further includes a first dead zone control circuit 53 and a first low dropout linear voltage regulator LDO1.

A first input end of the first dead zone control circuit 53 is connected to the first charging port Ch1, and an output end of the first dead zone control circuit 53 is connected to the first electronic controller EC1. An input end of the first low dropout linear voltage regulator LDO1 is connected to a third end of the first charging circuit CI1, and an output end of the first low dropout linear voltage regulator LDO1 is connected to a second input end of the first dead zone control circuit 53. When the battery level of the first battery Ba1 is less than or equal to a first threshold, and the first charging port Ch1 is connected to a charger, the charger connected to the first charging port Ch1 supplies power to the first electronic controller EC1 by using the first dead zone control circuit 53. When the battery level of the first battery Ba1 is greater than the first threshold, the first battery Ba1 supplies power to the first low dropout linear voltage regulator LDO1 by using the first charging circuit CI, and the first low dropout linear voltage regulator LDO1 supplies power to the first electronic controller EC1 by using the first dead zone control circuit 53.

Similarly, as shown in FIG. 5, the keyboard KB further includes a second dead zone control circuit 54 and a second low dropout linear voltage regulator LDO2. A first input end of the second dead zone control circuit 54 is connected to the second charging port Ch2, and an output end of the second dead zone control circuit 54 is connected to the second electronic controller EC2. An input end of the second low dropout linear voltage regulator LDO2 is connected to a third end of the second charging circuit C12, and an output end of the second low dropout linear voltage regulator LDO2 is connected to a second input end of the second dead zone control circuit 54. When the battery level of the second battery Ba2 is less than or equal to a second threshold, and the second charging port Ch2 is connected to a charger, the charger connected to the second charging port Ch2 supplies power to the second electronic controller EC2 by using the second dead zone control circuit 54. When the battery level of the second battery Ba2 is greater than the second threshold, the second battery Ba2 supplies power to the second low dropout linear voltage regulator LDO2 by using the second charging circuit C12, and the second low dropout linear voltage regulator LDO2 supplies power to the second electronic controller EC2 by using the second dead zone control circuit 54.

Figure 7:
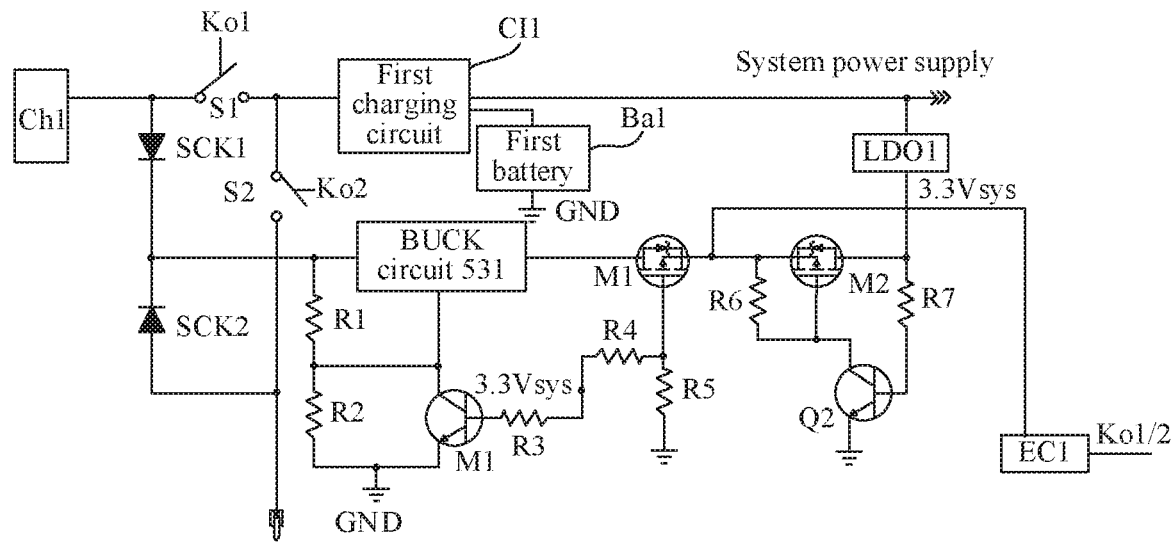
FIG. 7 is a schematic structural diagram of a mobile terminal according to yet another embodiment of this application.

As shown in FIG. 7, the first dead zone control circuit 53 includes a buck converter BUCK circuit 531, a first resistor RI, a second resistor R2, a third resistor R3, a fourth resistor R4, a fifth resistor R5, a sixth resistor R6, a seventh resistor R7, a first transistor Q1, a second transistor Q2, a first MOS transistor I1, and a second MOS transistor M2. An input end of the BUCK circuit is connected to the first input end of the first dead zone control circuit. A first terminal of the first resistor is connected to the first input end of the first dead zone control circuit. A second terminal of the first resistor is connected to an enable EN end of the BUCK circuit. The second terminal of the first resistor is further connected to a ground terminal by using the second resistor. The EN end of the BUCK circuit is further connected to a collector of the first transistor. An emitter of the first transistor is connected to the ground terminal. A base of the first transistor is connected to a first terminal of the third resistor. A second terminal of the third resistor is connected to the second input end of the first dead zone control circuit. The second terminal of the third resistor is further connected to a first terminal of the fourth resistor. An output end of the BUCK circuit is connected to a drain of the first MOS transistor. A source of the first MOS transistor is connected to a source of the second MOS transistor. A gate of the first MOS transistor is connected to the ground terminal by using the fifth resistor. A second terminal of the fourth resistor is further connected to the gate of the first MOS transistor. The source of the second MOS transistor is connected to a gate of the second MOS transistor by using the sixth resistor. The source of the second MOS transistor is connected to the output end of the first dead zone control circuit. The gate of the second MOS transistor is further connected to a collector of the second transistor. A drain of the second MOS transistor is connected to the second input end of the first dead zone control circuit. A base of the second transistor is connected to the second input end of the first dead zone control circuit by using the seventh resistor.

A structure of the second dead zone control circuit 54 of the keyboard KB is the same as a structure of the first dead zone control circuit 53 of the tablet computer PAD, as shown in the figure, and details are not described again.

In addition, as shown in FIG. 7, the tablet computer PAD further includes a first Schottky diode SCK1 and a second Schottky diode SCK2. An anode of the first Schottky diode SCK1 is connected to the first charging port Ch1, and a cathode of the first Schottky diode SCK2 is connected to a cathode of the second Schottky diode SCK2. An anode of the second Schottky diode SCK2 is connected to the second terminal of the second switch S2. The cathode of the first Schottky diode SCK1 is further connected to the first input end of the first dead zone control circuit 53.

A working principle of the first dead zone control circuit 53 is as follows. To implement that the exposed first charging port Ch1 is uncharged, the first switch S1 is in an off state by default. When the first battery is exhausted (the battery level of the first battery is less than the first threshold), and a charger is plugged in the first charging port Ch1, electric energy cannot be transferred to the battery. This is because that the first switch S1 needs to be controlled by the EC1 to switch between the off state and an on state. In this case, the exhausted first battery Ba1 cannot normally supply power to the EC1, therefore a system cannot be started and the state of the first switch S1 cannot be changed. In this embodiment of this application, the first dead zone control circuit 53 is used. As shown in FIG. 4, when the charger is plugged in the first charging port Ch1, the first dead zone control circuit 53 is immediately started to supply power to the EC1, the EC1 turns on the first switch S1, and the charger charges the first battery Ba1 by using the first charging circuit CI1. In this way, the battery level of the first battery Ba1 is recovered. A working principle of the second dead zone control circuit 53 of the keyboard KB is similar to that described above, and details are not described herein again.

With reference to a specific circuit structure shown in a figure, the following uses the first dead zone control circuit 53 of the tablet computer PAD as an example to describe a function of the first dead zone control circuit 53 of the tablet computer PAD.

There is a problem in an actual case. To be specific, when the S1 is off and the battery level of the first battery Ba1 is less than the first threshold, even if a charger is plugged in the first charging port Ch1, the first battery Ba1 cannot be charged, and a system cannot be started. Using the first dead zone control circuit 53 is to supply power to the EC1 to turn on the S1, so that the charger can supply power to the first battery Ba1. An implementation process is as follows.

When the battery level of the first battery Ba1 is excessively low (less than the first threshold), an output 3.3Vsys1 of the LDO1 is 0 V, and the Q1 is turned off. After the charger is plugged in the first charging port Ch1, the EN end is at a high voltage level (the BUCK circuit is enabled when the EN end is at the high voltage level, or disabled when the EN end is at a low voltage level), the BUCK circuit 531 is enabled by the EN, and current flows into the first Schottky diode SCK1 to supply power to the BUCK circuit 531. The M1 is turned on, the M2 is turned off, and the current flows into the EC1 through the M1. After being powered on, the EC1 turns on the S1 according to the foregoing charging mode. The charger charges the first battery Ba1 by using the first charging circuit CI1, and also supplies power to the LDO1. Then, the output 3.3Vsys1 of the LDO1 is 3.3 V. The Q1 is turned on, so that the EN end is connected to the ground terminal GND, and the BUCK circuit 531 and the M1 are turned off. In this case, the base of the Q2 is electrically turned on, so that the gate of the M2 is connected to the ground terminal GND. The M2 is turned on, and the LDO1 with the output voltage 3.3Vsys1 supplies power to the EC1 through the M2. In conclusion, dead zone control for the tablet computer PAD is implemented. Dead zone control for the keyboard KB is the same, and details are not described again. The M1 and the M2 are PMOS transistors. When a voltage difference between GS (Gate/Source, gate/source) terminals is a negative value, the PMOS transistor is turned on. When the voltage difference between the GS terminals is zero, the PMOS transistor is turned off. A GS voltage parasitic diode plays a role of preventing current backflow.

In addition, inaccurate alignment or wrong positioning may exist when the tablet computer PAD is connected to the keyboard KB. In this case, the tablet computer PAD cannot communicate with the keyboard KB. As shown in FIG. 5, in the solution provided in this embodiment of this application, the tablet computer PAD further includes a first peer-device in-position detection circuit 55. The first peer-device in-position detection circuit 55 is connected to the first electronic controller EC1 and a second connector Co2. The second connector Co2 is configured to connect to a ground terminal of the keyboard KB. Herein, the ground terminal of the keyboard KB is connected to a fourth connector Co4. When the second connector Co2 is connected to the fourth connector Co4, the second connector Co2 is connected to the ground terminal of keyboard KB. In this case, the first electronic controller EC1 determines, based on a voltage level of the second connector Co2, that the keyboard KB is in position.

As shown in FIG. 6, the first peer-device in-position detection circuit 55 includes a tenth resistor R10 and an eleventh resistor R11. A first terminal of the tenth resistor R10 is connected to a power supply VCC that has a predetermined voltage value, and a second terminal of the tenth resistor R10 is connected to a first terminal of the eleventh resistor R11. A second terminal of the eleventh resistor R11 is connected to the ground terminal GND. The second terminal of the tenth resistor R10 is further connected to the first electronic controller EC1 and the second connector Co2.

In this way, in a normal case, when the tablet computer PAD is not connected to the keyboard KB, the R10 and the R11 divide a voltage of the power supply, and the EC1 can detect the predetermined voltage value at the second terminal of the tenth resistor R10. However, when the tablet computer PAD is connected to the keyboard KB, the second terminal of the tenth resistor R10 is connected to the ground terminal GND of the keyboard KB by using the connectors, and the EC1 can detect that an electric potential at the second terminal of the tenth resistor R10 is zero. In this way, the EC1 may further notify, on the tablet computer PAD, a user that a connection succeeds. According to a same principle, the keyboard KB also includes a second peer-device in-position detection circuit 56. A function of the second peer-device in-position detection circuit 56 is the same as that of the first peer-device in-position detection circuit 55 of the tablet computer PAD, and details are not described again. Specifically, when the PAD is connected to the KB, the EC1 of the PAD may push, on a display interface of the PAD, a prompt to the user to indicate that the PAD is successfully connected to the KB, and the EC2 of the KB may also turn on a corresponding indicator of the KB to notify the user that the KB is successfully connected to the PAD.

In addition, when the first charging port Ch1 is a USB port, the first Charging port Ch1 further includes an identification ID pin. The ID pin is connected to the EC1. When an OTG transmission connector is plugged in the first charging port Ch1, the EC1 determines, based on a voltage level of the ID pin, that the OTG transmission connector is plugged in the first charging port Ch1. In addition, when the OTG transmission connector is plugged in the first charging port Ch1, the EC1 controls the S1 to be off, to prevent a conflict with a voltage of a charger of the tablet computer PAD.

Figure 8:
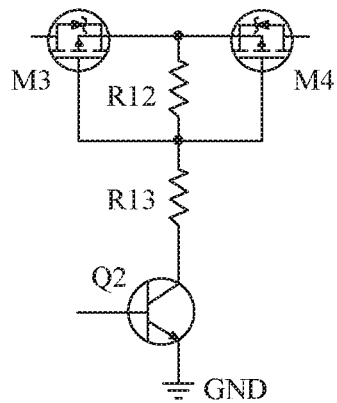
FIG. 8 is a schematic structural diagram of a switch according to an embodiment of this application.

A structure of each of the foregoing switches (S1, S2, S3, and S4) is shown in FIG. 8. The structure includes a third MOS transistor M3, a fourth MOS transistor M4, a twelfth resistor R12, a thirteenth resistor R13, and a third transistor Q3.

A drain of the third MOS transistor M3 is connected to the first terminal of the switch. A source of the third MOS transistor M3 is connected to a source of the fourth MOS transistor M4. A drain of the fourth MOS transistor M4 is connected to the second terminal of the switch.

The source of the third MOS transistor M3 is further connected to a first terminal of the twelfth resistor R12. A second terminal of the twelfth resistor R12 is connected to a gate of the third MOS transistor M3, a gate of the fourth MOS transistor M4, and a first terminal of the thirteenth resistor R13. A second terminal of the thirteenth resistor R13 is connected to a collector of the third transistor Q3. A base of the third transistor Q3 is connected to the control terminal of the switch. An emitter of the third transistor Q3 is connected to the ground terminal GND. The foregoing switches all have a back-to-back structure to prevent current backflow.

Figure 10:
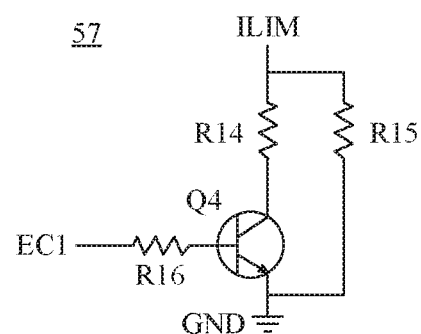
FIG. 10 is a schematic structural diagram of a first current-limited circuit according to an embodiment of this application.

In addition, the tablet computer PAD further includes a first current-limited circuit 57. As shown in FIG. 10, a current-limited pin of the first charging circuit CI1 is connected to an input end of the current-limited circuit. A control end of the first current-limited circuit 57 is connected to the EC1. The EC1 determines a charging power of the first battery Ba1 and a charging power of the second battery Ba2 based on the battery level of the first battery Ba1 and the battery level of the second battery Ba2. The first electronic controller EC1 controls, based on the charging power of the first battery Ba1, a current of the current-limited pin of the first charging circuit CI1 by using the first current-limited circuit 57, and sends the charging power of the second battery Ba2 to the keyboard KB. The charging power used by the first charging circuit CI1 to charge the first battery Ba1 corresponds to the current of the current-limited pin. The first current-limited circuit 57 includes a fourteenth resistor R14, a fifteenth resistor R15, a sixteenth resistor R16, and a fourth transistor Q4. A first terminal of the fourteenth resistor R14 is connected to the current-limited pin of the charging circuit 12, and a second terminal of the fourteenth resistor R14 is connected to a collector of the fourth transistor Q4. A first terminal of the fifteenth resistor R15 is connected to the current-limited pin of the charging circuit 12, and a second terminal of the fifteenth resistor R15 is connected to the ground terminal GND. A gate of the fourth transistor Q4 is connected to the control end of the first current-limited circuit 57 by using the sixteenth resistor R16, and an emitter of the fourth transistor Q4 is connected to the ground terminal GND. The keyboard KB further includes a second current-limited circuit. A current-limited pin of the second charging circuit CI2 is connected to an input end of the current-limited circuit. A control end of the second current-limited circuit is connected to the EC2. The EC2 controls, based on the charging power of the second battery Ba2 sent by the EC1, a current of the current-limited pin of the second charging circuit CI2 by using the second current-limited circuit. The charging power used by the second charging circuit CI2 to charge the second battery Ba2 corresponds to the current of the current-limited pin. A specific structure of the second current-limited circuit of the keyboard KB is the same as a structure of the first current-limited circuit 57 of the tablet computer PAD, and details are not described herein again.

Figure 9:
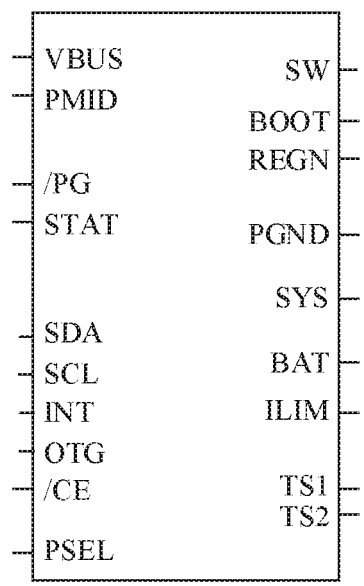
FIG. 9 is a schematic structural diagram of a charger chip used by a first charging circuit according to an embodiment of this application.

The first charging circuit and/or the second charging circuit may use a BQ24x9x series charger (charger) chip (an accompanying drawing of a peripheral circuit of the charger chip is not shown). The charger chip includes a current-limited pin ILIM (shown in FIG. 9). A charging current is adjusted through control on a resistor connected to the ILIM, so that a charging circuit outputs a specified current, thereby implementing dynamic power allocation. For example, a charger is plugged in the keyboard KB, and it is assumed that R14=354Ω, R15=1.05 kΩ, and R16=1 kΩ.

(1) A total power of the charger is 10 W. When the battery level of the first battery of the tablet computer PAD is relatively low, and the charger of the keyboard KB charges the first battery of the tablet computer PAD, the Q4 transistor is turned off. In this case, the resistor R connected to the ILIM is 1.05 K. If a specified charging current is set to be 500 mA, and a voltage is 5 V, a power is 2.5 W. In other words, 7.5 W is allocated to charge the first battery of the tablet computer. (2) When the keyboard KB does not charge the tablet computer PAD, the Q4 transistor is turned on. In this case, R=265Ω. If the specified current is 2 A, the keyboard KB uses the entire 10 W power to charge the second battery of the keyboard. Similarly, when a charger is plugged in the tablet computer PAD, according to a principle similar to that described above, a power of 7.5 W may be allocated to charge the tablet computer PAD, and a power of 2.5 W may be allocated to charge the keyboard KB.

Figure 11:
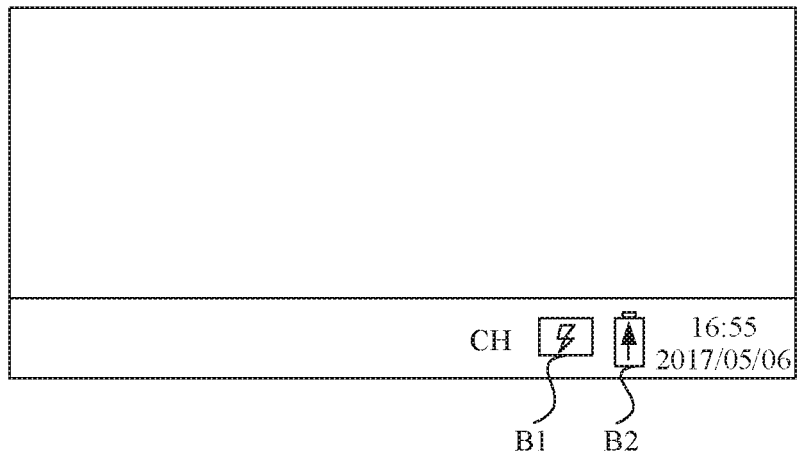
FIG. 11 is a schematic diagram of a display interface of a mobile terminal according to an embodiment of this application.
Figure 12:
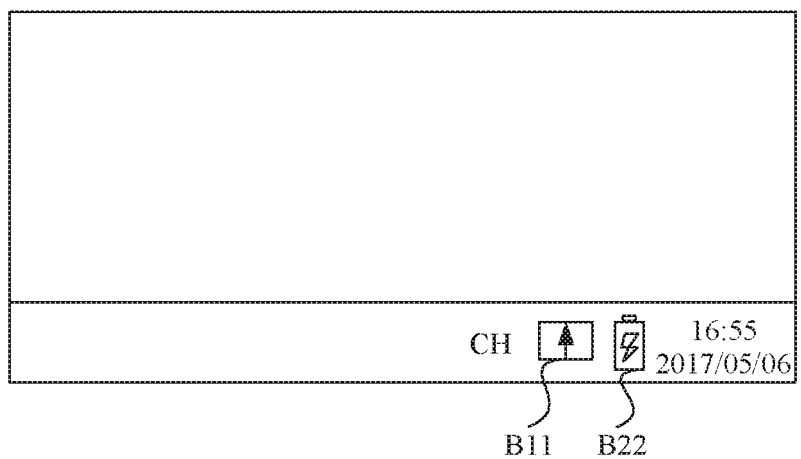
FIG. 12 is a schematic diagram of a display interface of a mobile terminal according to another embodiment of this application.
Figure 13:
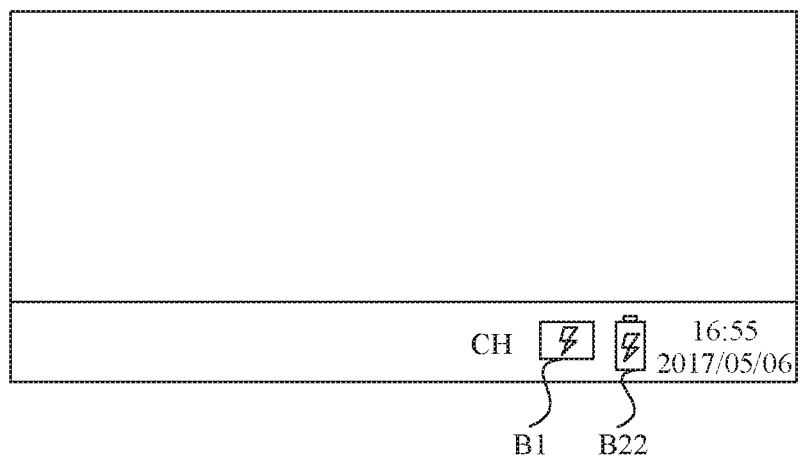
FIG. 13 is a schematic diagram of a display interface of a mobile terminal according to still another embodiment of this application.

In addition, in an embodiment, the tablet computer PAD further includes a first display module 58. When determining that the first battery is in a charging state, the first electronic controller EC1 controls the first display module 58 to display an icon indicating that the tablet computer PAD is in a charging state. When determining that the first battery is in a power supply state, the first electronic controller EC1 controls the first display module 58 to display an icon indicating that the PAD is in a power supply state. When determining that the second battery is in a charging state, the first electronic controller EC1 controls the first display module 58 to display an icon indicating that the keyboard KB is in a charging state. When determining that the second battery is in a power supply state, the first electronic controller EC1 controls the first display module 58 to display an icon indicating that the keyboard KB is in a power supply state. As shown in FIG. 11 to FIG. 13, based on the foregoing charging mode, the tablet computer PAD uses the first display module 58 (for example, a screen) to display the icons indicating the charging states of the tablet computer PAD and the keyboard KB.

As shown in FIG. 11, when the second battery charges the first battery, the tablet computer PAD may display, on a status bar of a screen, an icon B1 indicating that the tablet computer PAD is in the charging state, and an icon B2 indicating that the keyboard KB is in the power supply state. The B1 and the B2 may be displayed differently, to distinguish between the tablet computer PAD and the keyboard KB.

As shown in FIG. 12, when the first battery charges the second battery, the tablet computer PAD may display, on the status bar of the screen, an icon B11 indicating that the tablet computer PAD is in the power supply state, and an icon B22 indicating that the keyboard KB is in the charging state. The B11, and the B22 may be displayed differently, to distinguish between the tablet computer PAD and the keyboard KB.

As shown in FIG. 13, when a charger connected to the first charging port charges the first battery and the second battery, the tablet computer PAD may display, on the status bar of the screen, the icon 31 indicating that the tablet computer PAD is in the charging state, and the icon B22 indicating that the keyboard KB is in the charging state. The B1 and the B22 may be displayed differently, to distinguish between the tablet computer PAD and the keyboard KB. As shown in FIG. 13, when a charger connected to the first charging port charges the first battery and the second battery, the tablet computer PAD may display, on the status bar of the screen, the icon B1 indicating that the tablet computer PAD is in the charging state, and the icon B22 indicating that the keyboard KB is in the charging state. The B1 and the B22 may be displayed differently, to distinguish between the tablet computer PAD and the keyboard KB. As shown in FIG. 13, when the charger connected to the first charging port charges the first battery, and the charger connected to the second charging port charges the second battery, the tablet computer PAD may display, on the status bar of the screen, the icon 31 indicating that the tablet computer PAD is in the charging state, and the icon B22 indicating that the keyboard KB is in the charging state. The B1 and the B22 may be displayed differently, to distinguish between the tablet computer PAD and the keyboard KB.

In addition, in an embodiment, the keyboard KB further includes a second display module 59. When determining that the first battery is in a charging state, the second electronic controller EC2 controls the second display module 59 to display an icon indicating that the tablet computer PAD is in a charging state. When determining that the first battery is in a power supply state, the second electronic controller EC2 controls the second display module 59 to display an icon indicating that the tablet computer PAD is in a power supply state. When determining that the second battery is in a charging state, the second electronic controller EC2 controls the second display module 59 to display an icon indicating that the keyboard KB is in a charging state. When determining that the second battery is in a power supply state, the second electronic controller EC2 controls the second display module 59 to display an icon indicating that the keyboard KB is in a power supply state. Certainly, a peripheral device such as the keyboard KB is usually a product with relatively low costs. If the keyboard KB includes a screen that is configured to display an image, the keyboard KB may use the screen to display the power supply state/charging state of the tablet computer PAD and the keyboard KB, in a way as the tablet computer PAD does. If the keyboard KB includes no screen that is configured to display an image, the keyboard KB may use an indicator in different colors, or indicators in different positions on the keyboard, to indicate the power supply state/charging state of the tablet computer PAD and the keyboard KB.

Based on the mobile terminal and the peripheral device provided above, an embodiment of this application provides a charging control method, including the following steps.

101: A mobile terminal determines a charging mode based on a battery level of a first battery of the mobile terminal and a battery level of a second battery of a peripheral device.

Step 101 specifically includes the following: When determining that the battery level of the first battery of the mobile terminal is relatively low and is less than a third threshold, the mobile terminal determines that the charging mode is that the second battery charges the first battery; or when determining that the battery level of the second battery of the peripheral device is relatively low and is less than a fourth threshold, the mobile terminal determines that the charging mode is that the first battery charges the second battery. The charging mode includes that the first battery charges the second battery of the peripheral device, or that the second battery charges the first battery.

When the first battery charges the second battery, if the mobile terminal determines that the battery level of the first battery is less than a fifth threshold, the mobile terminal controls a second switch to be off, and sends a charging termination control instruction to the peripheral device. The peripheral device receives the charging termination control instruction sent by the mobile terminal, and controls, according to the charging termination control instruction, a fourth switch to be off.

When the second battery charges the first battery, if the mobile terminal determines that the battery level of the second battery is less than a sixth threshold, the mobile terminal controls the second switch to be off, and sends a power supply termination control instruction to the peripheral device. The peripheral device receives the power supply termination control instruction sent by the mobile terminal, and controls, according to the power supply termination control instruction, the fourth switch to be off.

When a first charging port of the mobile terminal is connected to a charger and/or a charging port of the peripheral device is connected to a charger, for a method of determining the charging mode, the following is further included: The mobile terminal determines, based on a sampling voltage of the first charging port of the mobile terminal, whether the first charging port is connected to a charger; and when determining that the first charging port of the mobile terminal is connected to a charger and/or that the second charging port of the peripheral device is connected to a charger, the mobile terminal re-determines the charging mode. The charging mode further includes that the charger connected to the first charging port charges the first battery and the second battery, that the charger connected to the second charging port of the peripheral device charges the first battery and the second battery, or that the charger connected to the first charging port charges the first battery and the charger connected to the second charging port charges the second battery.

In addition, in a process that the charger connected to the first charging port charges the first battery and the second battery, or that the charger connected to the second charging port charges the first battery and the second battery, the following is further included: The mobile terminal determines a charging power of the first battery and a charging power of the second battery based on the battery level of the first battery of the mobile terminal and the battery level of the second battery of the peripheral device, and sends the charging power of the second battery to the peripheral device. The peripheral device performs, based on the charging power of the second battery, charging power control.

102: The mobile terminal controls states of a first switch and the second switch based on the charging mode, and sends control information to the peripheral device to notify the peripheral device of the charging mode.

103: The peripheral device determines the charging mode based on the control information sent by the mobile terminal.

104: The peripheral device controls states of a third switch and the fourth switch based on the charging mode, where the charging mode includes that the second battery charges the first battery, or that the first battery charges the second battery.

When the first charging port of the mobile terminal is connected to a charger and/or the charging port of the peripheral device is connected to a charger, for the method of determining the charging mode, the charging mode further includes that the charger connected to the first charging poll charges the first battery and the second battery, that the charger connected to the second charging port of the peripheral device charges the first battery and the second battery, or that the charger connected to the first charging port charges the first battery and the charger connected to the second charging port charges the second battery.

In the foregoing method embodiment, for controlling, by the mobile terminal, the states of the first switch and the second switch based on the charging mode, and for controlling, by the peripheral device, the states of the third switch and the fourth switch based on the charging mode, refer to descriptions in the apparatus embodiments. Details are not described herein again.

In an embodiment, when determining that the first battery is in a charging state, the mobile terminal displays an icon indicating that the mobile terminal is in a charging state. When determining that the first battery is in a power supply state, the mobile terminal displays an icon indicating that the mobile terminal is in a power supply state. When determining that the second battery is in a charging state, the mobile terminal displays an icon indicating that the peripheral device is in a charging state. When determining that the second battery is in a power supply state, the mobile terminal displays an icon indicating that the peripheral device is in a power supply state.

When determining that the first battery is in the charging state, the peripheral device displays an icon indicating that the mobile terminal is in a charging state. When determining that the first battery is in the power supply state, the peripheral device displays an icon indicating that the mobile terminal is in a power supply state. When determining that the second battery is in the charging state, the peripheral device displays an icon indicating that the peripheral device is in a charging state. When determining that the second battery is in the power supply state, the peripheral device displays an icon indicating that the peripheral device is in a power supply state.

For a technical effect implemented by each part of the foregoing method embodiments, refer to descriptions in the apparatus embodiments. Details are not described herein again.

Specifically, with reference to the foregoing structures and the foregoing charging method of the tablet computer PAD and the keyboard KB, an embodiment of this application provides specific charging control logic.

When a control priority of the EC1 of the tablet computer PAD is relatively high, a charging control logic procedure is provided.

Figure 14A:
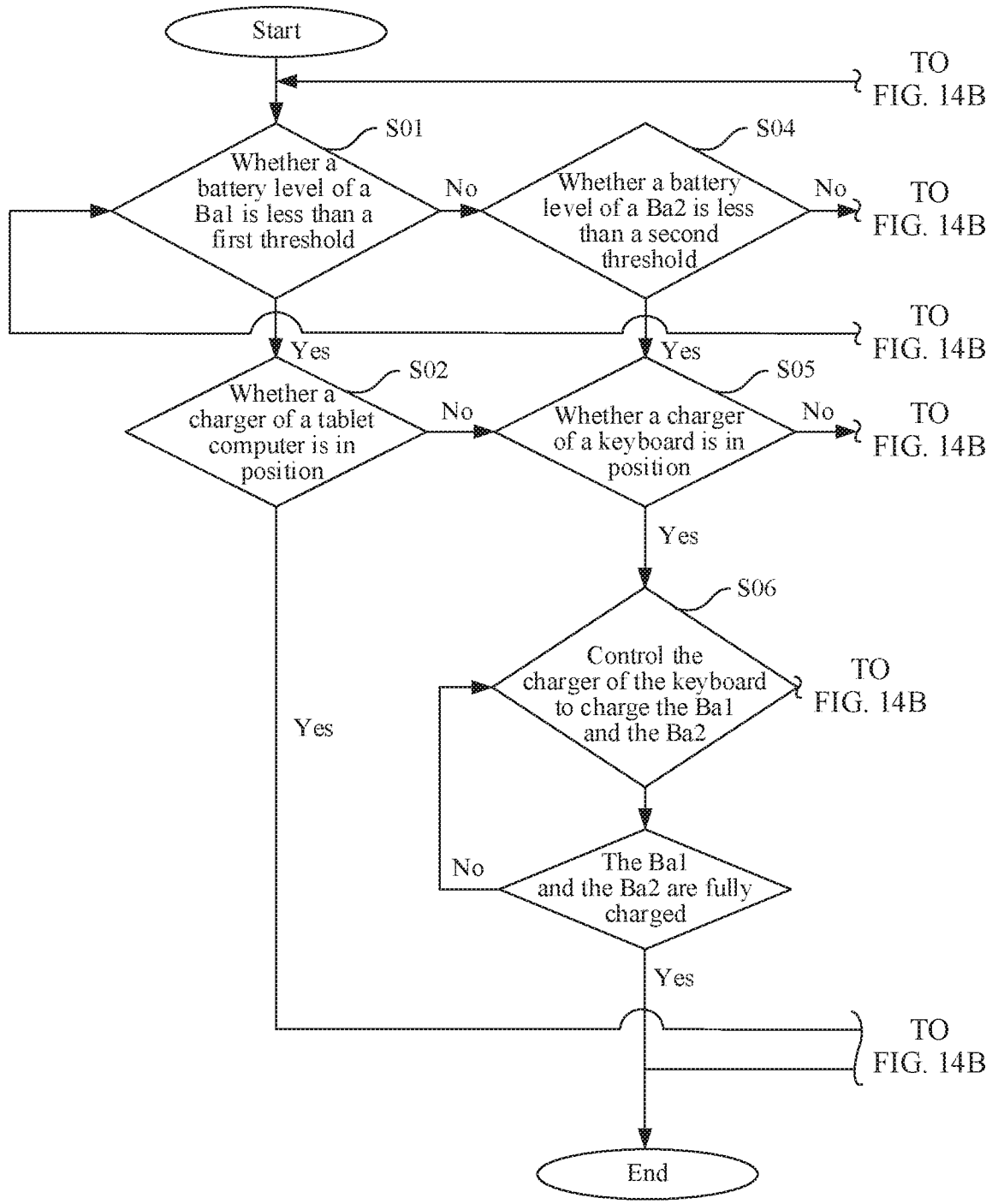
FIG. 14A and FIG. 14B are a schematic diagram of charging control logic according to an embodiment of this application.
Figure 14B:
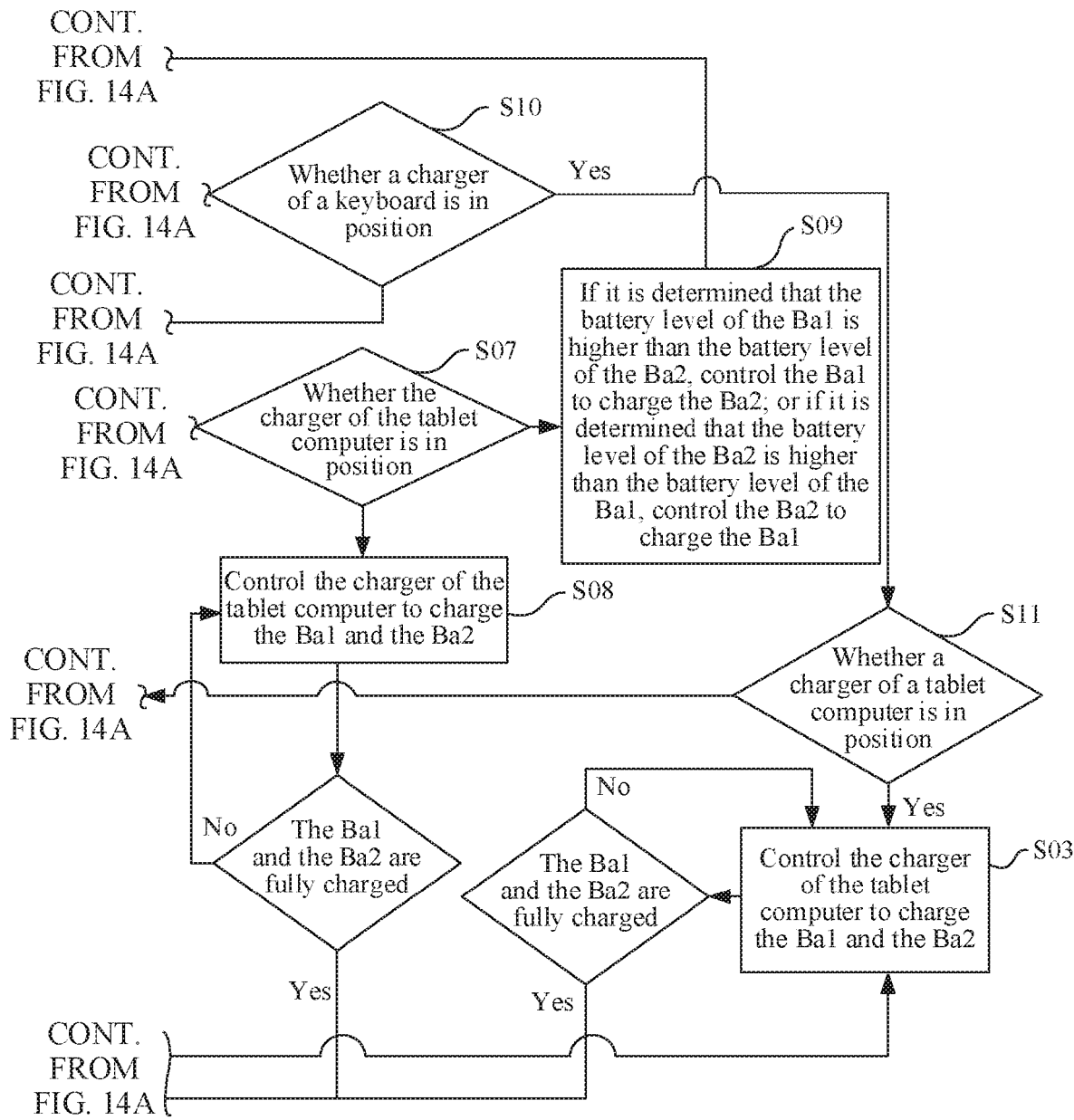

First, when the tablet computer PAD is connected to the keyboard KB by using a hardware connector, the EC1 of the tablet computer PAD determines, by detecting that an electric potential at the second terminal of the tenth resistor R10 of the peer electronic device in-position detection circuit is zero, that the keyboard KB is in position; and the EC2 of the keyboard KB determines, by detecting that the electric potential at the second terminal of the tenth resistor R10 of the peer electronic device in-position detection circuit is zero, that the tablet computer PAD is in position, and the EC2 reports, to the EC1 of the tablet computer, that the tablet computer PAD is in position. Then, the EC1 of the tablet computer PAD detects the battery level of the first battery Ba1 by using the first charging circuit CI1, and the EC2 of the keyboard KB detects the battery level of the second battery Ba2 by using the second charging circuit CI2. The EC1 of the tablet computer PAD communicates with the EC2 of the keyboard KB in by using a USB. The EC1 of the tablet computer PAD obtains the battery level of the second battery Ba2 that is detected by the EC2 of the keyboard KB. Referring to FIG. 14A and FIG. 14B, the EC1 performs charging control, S01: Determine whether the battery level of the first battery Ba1 of the tablet computer is less than the first threshold. If the battery level of the first battery Ba1 of the tablet computer is less than the first threshold, perform S02. If the battery level of the first battery Ba1 of the tablet computer is not less than the first threshold, perform S04. The first threshold may be set to be any value, and certainly, a relatively small value, for example, 5%, is generally used, so that when it is determined that a remaining battery level of the tablet computer is relatively low, the tablet computer is charged.

S02: Determine whether a charger of the tablet computer is in position. If the charger of the tablet computer is not in position, perform S05. If the charger of the tablet computer is in position, perform S03.

For a specific manner of determining whether the tablet computer is in position in step S02, refer to the foregoing descriptions, and details are not described herein again.

S03: Control the charger of the tablet computer to charge the Ba1 of the tablet computer and the Ba2 of the keyboard, until the Ba1 and the Ba2 are fully charged.

In this case, the foregoing Solution 1 is used. To be specific, the EC1 of the tablet computer PAD controls the first switch S1 and the second switch S2 of the tablet computer PAD to be on, the EC2 of the keyboard KB controls the fourth switch S4 of the keyboard KB to be on, and the EC2 of the keyboard KB controls the third switch S3 of the keyboard KB to be off. The charger of the tablet computer charges the Ba1 of the tablet computer and the Ba2 of the keyboard respectively according to the following two paths:

The charging path 1 is as follows: the charger→the USB port of the tablet computer PAD→the first switch S1 of the tablet computer PAD→the first charging circuit Ch1 of the tablet computer PAD→the first battery Ba1 of the tablet computer PAD.

The charging path 2 is as follows: the charger→the USB port of the tablet computer PAD→the first switch S1 of the tablet computer PAD→the second switch S2 of the tablet computer PAD→the fourth switch S4 of the keyboard KB→the second charging circuit Ch2 of the keyboard KB→the second battery Ba2 of the keyboard KB.

Certainly, during charging, charging powers for charging the batteries may be allocated to the tablet computer and the keyboard by using a current-limited circuit.

S04: Determine whether the battery level of the Ba2 of the keyboard is less than the second threshold. If the battery level of the Ba2 of the keyboard is less than the second threshold, perform S05. If the battery level of the Ba2 of the keyboard is not less than the second threshold, perform S10. The second threshold may be set to be any value, and certainly, a relatively small value, for example, 5%, is generally used, so that when it is determined that a remaining battery level of the Ba2 of the keyboard is relatively low, the keyboard is charged.

S05: Determine whether a charger of the keyboard is in position. If the charger of the keyboard is in position, perform S06. If the charger of the keyboard is not in position, perform S07.

S06: Control the charger of the keyboard to charge the Ba1 of the tablet computer and the Ba2 of the keyboard, until the Ba1 and the Ba2 are fully charged.

In this case, the foregoing Solution 2 is used. To be specific, the EC1 of the tablet computer PAD controls the second switch S2 of the tablet computer PAD to be on, the EC1 of the tablet computer PAD controls the first switch S1 of the tablet computer PAD to be off, and the EC2 of the keyboard KB controls the third switch S3 and the fourth switch S4 of the keyboard KB to be on. The charger of the keyboard charges the Ba1 of the tablet computer and the Ba2 of the keyboard respectively according to the following two paths:

The charging path 1 is as follows: the charger→the USB port of the keyboard KB→the third switch S3 of the keyboard KB→the second charging circuit Ch2 of the keyboard KB→the second battery Ba2 of the keyboard KB:

The charging path 2 is as follows: the charger→the USB port of the keyboard KB→the third switch S3 of the keyboard KB→the fourth switch S4 of the keyboard KB→the second switch S2 of the tablet computer PAD→the first charging circuit Ch1 of the tablet computer PAD→the first battery Ba1 of the tablet computer PAD.

Certainly, during charging, charging powers for charging the batteries may be allocated to the tablet computer and the keyboard by using a current-limited circuit of the keyboard.

S07: Determine whether the charger of the tablet computer is in position. If the charger of the tablet computer is not in position, perform S09. If the charger of the tablet computer is in position, perform S08.

S08: Control the charger of the tablet computer to charge the Ba1 of the tablet computer and the Ba2 of the keyboard, until the Ba1 and the Ba2 are fully charged.

S09: If it is determined that the battery level of the Ba1 of the tablet computer is higher than the battery level of the Ba2 of the keyboard, control the Ba1 of the tablet computer to charge the Ba2 of the keyboard; or if it is determined that the battery level of the Ba2 of the keyboard is higher than the battery level of the Ba1 of the tablet computer, control the Ba2 of the keyboard to charge the Ba1 of the tablet computer. In addition, continue to perform S01 in the process of S09.

For a process that the Ba1 of the tablet computer charges the Ba2 of the keyboard, or that the Ba2 of the keyboard charges the Ba1 of the tablet computer, refer to the descriptions in the foregoing embodiments. Details are not described herein again.

S10: Determine whether the charger of the keyboard is in position. If the charger of the keyboard is in position, perform S11. If the charger of the keyboard is not in position, perform S01.

S11: Determine whether the charger of the tablet computer is in position. If the charger of the tablet computer is not in position, perform S06. If the charger of the tablet computer is in position, perform S03.

Certainly, the foregoing is merely one type of control logic, and the foregoing control logic is implemented based on basic functions of structures of the device provided in the embodiments of this application. Certainly, other control logic that may be implemented based on the device provided in the embodiments of this application should also fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobile terminal, comprising:
   a first charging port;
   a first battery comprising a first battery level;
   a first charging circuit comprising:
      a current-limited pin;
      a first end;
      a second end coupled to the first battery and configured to control a charging process of the first battery; and
      a third end;
   a first connector configured to couple to a peripheral device;
   a first switch comprising:
      a first terminal coupled to the first charging port;
      a second terminal coupled to the first end; and
      a first control terminal;
   a second switch comprising:
      a third terminal coupled to the first end;
      a fourth terminal coupled to the first connector; and
      a second control terminal;
   a first electronic controller coupled to the first control terminal and the second control terminal and in communication with the peripheral device, wherein the first electronic controller is configured to:
      determine a charging mode based on the first battery level and a second battery level of a second battery of the peripheral device, wherein the charging mode comprises that the first battery charges the second battery or that the second battery charges the first battery;

control a first state of the first switch and a second state of the second switch based on the charging mode; and send control information to the peripheral device to notify the peripheral device of the charging mode;

a first dead zone control circuit comprising:
a first input end coupled to the first charging port;
a second input end; and
a first output end coupled to the first electronic controller; and a first low dropout linear voltage regulator comprising:
a third input end coupled to the third end; and a second output end coupled to the second input end;
wherein the first electronic controller is further configured to receive, from a first charger coupled to the first charging port, first power using the first dead zone control circuit when the first battery level is less than or equal to a first threshold, and wherein the first battery is configured to supply power to the first low dropout linear voltage regulator using the first charging circuit to enable the first low dropout linear voltage regulator to supply power to the first electronic controller using the first dead zone control circuit when the first battery level is greater than the first threshold.

2. The mobile terminal of claim 1, wherein the first dead zone control circuit further comprises:
a ground terminal;
a first transistor comprising:
a first collector;
a first base; and
a first emitter coupled to the ground terminal;
a second transistor comprising:
a second collector;
a second base; and
a second emitter coupled to the ground terminal;
a first metal-oxide-semiconductor (MOS) transistor comprising:
a first drain;
a first source; and
a first gate;
a second MOS transistor comprising:
a second source coupled to the first source and to the first output end;
a second gate coupled to the second collector; and
a second drain coupled to the second input end;
a buck converter (BUCK) circuit comprising:
an enable (EN) end coupled to the first collector;
a fourth input end coupled to the first input end; and
a third output end coupled to the first drain;
a first resistor comprising:
a fifth terminal coupled to the first input end; and
a sixth terminal coupled to the EN end;
a second resistor comprising:
a seventh terminal coupled to the sixth terminal; and
an eighth terminal coupled to the ground terminal;
a third resistor comprising:
a ninth terminal coupled to the first base; and
a tenth terminal coupled to the second input end;
a fourth resistor comprising:
an eleventh terminal coupled to the tenth terminal; and
a twelfth terminal coupled to the first gate;
a fifth resistor comprising:
a thirteenth terminal coupled to the ground terminal; and
a fourteenth terminal coupled to the first gate;

a sixth resistor comprising:
a fifteenth terminal coupled to the second source; and
a sixteenth terminal coupled to the second gate; and
a seventh resistor comprising:
an eighteenth terminal coupled to the second base; and
a nineteenth terminal coupled to the second input end.

3. The mobile terminal of claim 2, further comprising:
a first Schottky diode comprising:
a first anode coupled to the first charging port; and
a first cathode coupled to the first input end; and
a second Schottky diode comprising:
a second cathode coupled to the first cathode; and
a second anode coupled to the fourth terminal.

4. The mobile terminal of claim 1, further comprising a charger detection circuit coupled to the first charging port and the first electronic controller, wherein the charger detection circuit is configured to obtain a sampling voltage of the first charging port, and wherein the first electronic controller is further configured to:
determine, based on the sampling voltage, whether the first charging port is coupled to a second charger; and
re-determine, in response to determining that the first charging port is coupled to the second charger or that a second charging port of the peripheral device is coupled to a third charger, the charging mode, and wherein the charging mode further comprises that the second charger charges the first battery and the second battery, that the third charger charges the first battery and the second battery, or that the second charger charges the first battery and the third charger charges the second battery.

5. The mobile terminal of claim 4, wherein the charger detection circuit comprises:
a first resistor comprising:
a fifth terminal coupled to the first charging port; and
a sixth terminal; and
a second resistor comprising:
a seventh terminal coupled to the sixth terminal and to the first electronic controller; and
an eighth terminal coupled to a ground terminal, and
wherein the first electronic controller is further configured to:
obtain a second sampling voltage of the seventh terminal; and
determine, based on the second sampling voltage, whether the first charging port is coupled to a fourth charger.

6. The mobile terminal of claim 1, further comprising a peer-device detection circuit coupled to the first electronic controller and a second connector, wherein the second connector is configured to couple to a ground terminal of a peer device, and wherein when the second connector is coupled to the ground terminal, the first electronic controller is further configured to determine, based on a voltage level of the second connector, whether the peer device is coupled.

7. The mobile terminal of claim 6, wherein the peer-device detection circuit comprises:
a first resistor comprising:
a fifth terminal coupled to a power supply comprising a predetermined voltage value; and
a sixth terminal coupled to the first electronic controller and the second connector; and
a second resistor comprising:
a seventh terminal coupled to the sixth terminal; and
an eighth terminal coupled to the ground terminal.

8. The mobile terminal of claim 1, wherein the first charging port is a universal serial bus (USB) port, wherein the first charging port comprises an identification (ID) pin coupled to the first electronic controller, and wherein when an on-the-go (OTG) transmission connector is plugged in the first charging port, the first electronic controller is further configured to determine, based on a voltage level of the ID pin, that the OTG transmission connector is plugged in the first charging port.

9. The mobile terminal of claim 1, wherein the first switch or the second switch further comprises:
a ground terminal;
a transistor comprising:
a collector;
an emitter coupled to the ground terminal; and
a base;
a first resistor comprising:
a fifth terminal; and
a sixth terminal;
a second resistor comprising:
a seventh terminal coupled to the sixth terminal; and
an eighth terminal coupled to the collector;
a first metal-oxide-semiconductor (MOS) transistor comprising:
a first source coupled to the fifth terminal;
a first drain; and
a first gate coupled to the sixth terminal;
a second MOS transistor comprising:
a second source coupled to the first source;
a second gate coupled to the sixth terminal; and
a second drain,
wherein when the first switch comprises the first MOS transistor, the second MOS transistor, the first resistor, the second resistor, and the transistor:
the first drain is coupled to the first terminal;
the second drain is coupled to the second terminal; and
the base is coupled to the first control terminal, and
wherein when the second switch comprises the first MOS transistor, the second MOS transistor, the first resistor, the second resistor, and the transistor:
the first drain is coupled to the third terminal;
the second drain is coupled to the fourth terminal; and
the base is coupled to the second control terminal.

10. The mobile terminal of claim 4, further comprising a current-limited circuit comprising:
a fourth input end coupled to the current-limited pin; and
a third control end coupled to the first electronic controller,
wherein the first electronic controller is further configured to:
determine a first charging power of the first battery based on the first battery level and a second charging power of the second battery based on the second battery level;
control, based on the first charging power and using the current-limited circuit, a current of the current-limited pin; and
send the second charging power to the peripheral device, wherein a third charging power used by the first charging circuit to charge the first battery corresponds to the current of the current-limited pin.

11. The mobile terminal of claim 10, wherein the current-limited circuit further comprises:
a ground terminal;
a transistor comprising:
a collector;
a base; and
an emitter coupled to the ground terminal;
a first resistor comprising:
a fifth terminal coupled to the current-limited pin; and
a sixth terminal coupled to the collector; and
a second resistor comprising:
a seventh terminal coupled to the current-limited pin; and
an eighth terminal coupled to the ground terminal; and
a third resistor comprising:
a ninth terminal coupled to the base; and
a tenth terminal coupled to the third control end.

12. The mobile terminal of claim 1, further comprising a first display, wherein the first electronic controller is further configured to:
control the first display to display an icon indicating that the mobile terminal is in a charging state when the first battery is in the charging state;
control the first display to display an icon indicating that the mobile terminal is in a power supply state when the first battery is in the power supply state;
control the first display to display an icon indicating that the peripheral device is in the charging state when the second battery is in the charging state; and
control the first display to display an icon indicating that the peripheral device is in the power supply state when the second battery is in the power supply state.

13. The mobile terminal of claim 1, wherein the first electronic controller is further configured to:
determine that the charging mode is that the second battery charges the first battery when the first battery level is relatively low and is less than a third threshold; and
determine that the charging mode is that the first battery charges the second battery when the second battery level is relatively low and is less than a fourth threshold.

14. The mobile terminal of claim 13, wherein the first battery is further configured to charge the second battery, and wherein the first electronic controller is further configured to:
determine that the first battery level is less than a fifth threshold;
control the second switch to be off; and
send a charging termination control instruction to the peripheral device, and
wherein when the second battery charges the first battery, the first electronic controller is further configured to:
determine that the second battery level is less than a sixth threshold;
control the second switch to be off; and
send a power supply termination control instruction to the peripheral device.

15. The mobile terminal of claim 1, wherein the first connector is a pogo pin spring thimble connector.

16. A peripheral device, comprising:
a second charging port;
a third connector configured to couple to a mobile terminal;
a second battery comprising a second battery level;
a second charging circuit comprising:
a first end;
a second end coupled to the second battery and configured to control a charging process of the second battery; and
a third end;
a third switch comprising:
a first terminal coupled to the second charging port;
a second terminal coupled to the first end of the second charging circuit; and
a third control terminal;

a fourth switch comprising:
a first terminal coupled to the first end of the second charging circuit,
a second terminal coupled to the third connector; and
a fourth control terminal;
a second electronic controller coupled to the third control terminal and the fourth control terminal, and in communication with the mobile terminal, wherein the second electronic controller is configured to:
receive control information from the mobile terminal;
determine a charging mode based on the control information; and
control a first state of the third switch and a second state of the fourth switch based on the charging mode, wherein the charging mode comprises that the second battery charges a first battery of the mobile terminal, or that the first battery charges the second battery;
a second dead zone control circuit comprising:
a first input end coupled to the second charging port;
a second input end; and
a first output end coupled to the second electronic controller; and
a second low dropout linear voltage regulator comprising:
a third input end coupled to the third end; and
a second output end coupled to the second input end,
wherein a charger connected to the second charging port supplies power to the second electronic controller using the second dead zone control circuit when the battery level of the second battery is less than or equal to a second threshold, and the second charging port is connected to the charger; and
wherein the second battery is configured to supply power to the second low dropout linear voltage regulator using the second charging circuit, and the second low dropout linear voltage regulator supplies power to the second electronic controller by using the second dead zone control circuit when the battery level of the second battery is greater than the second threshold.

17. A charging method implemented by a mobile terminal, comprising:
determining a charging mode based on a first battery level of a first battery of the mobile terminal and a second battery level of a second battery of a peripheral device, wherein the charging mode comprises that the first battery charges the second battery or that the second battery charges the first battery;
controlling a first state of a first switch and a second state of a second switch based on the charging mode;
sending control information to the peripheral device to notify the peripheral device of the charging mode;
displaying an icon indicating that the mobile terminal is in a charging state when the first battery is in the charging state;
displaying an icon indicating that the mobile terminal is in a power supply state when the first battery is in the power supply state;
displaying an icon indicating that the peripheral device is in the charging state when the second battery is in the charging state; and
displaying an icon indicating that the peripheral device is in the power supply state when the second battery is in the power supply state.

18. The charging method of claim 17, further comprising:
determining, based on a sampling voltage of a first charging port of the mobile terminal, whether the first charging port is coupled to a first charger; and
re-determining the charging mode when the first charging port is coupled to the first charger or that a second charging port of the peripheral device is coupled to a second charger, wherein the charging mode further comprises that the first charger charges the first battery and the second battery, that the second charger charges the first battery and the second battery, or that the first charger charges the first battery and the second charger charges the second battery.

19. The charging method of claim 18, further comprising:
determining a first charging power of the first battery based on the first battery level and a second charging power of the second battery based on the second battery level; and
sending the second charging power to the peripheral device.

20. The charging method of claim 17, further comprising:
determining that the charging mode is that the second battery charges the first battery when the first battery level is relatively low and is less than a third threshold;
determining that the charging mode is that the first battery charges the second battery when the second battery level is relatively low and is less than a fourth threshold,
wherein when the first battery charges the second battery:
determining that the first battery level is less than a fifth threshold;
controlling the second switch to be off; and
sending a charging termination control instruction to the peripheral device, and
wherein when the second battery charges the first battery:
determining that the second battery level is less than a sixth threshold;
controlling the second switch to be off; and
sending a power supply termination control instruction to the peripheral device.

* * * * *